US012309125B2

(12) United States Patent
Borrill

(10) Patent No.: US 12,309,125 B2
(45) Date of Patent: May 20, 2025

(54) CLASSICAL IMPLEMENTATION OF QUANTUM ENTANGLEMENT IN DATACENTER NETWORK DESIGN

(71) Applicant: Paul L. Borrill, Palo Alto, CA (US)

(72) Inventor: Paul L. Borrill, Palo Alto, CA (US)

(73) Assignee: Eric Litak, Reno, NV (US)

( * ) Notice: Subject to any disclaimer, the term of this patent is extended or adjusted under 35 U.S.C. 154(b) by 65 days.

(21) Appl. No.: 18/462,396

(22) Filed: Sep. 6, 2023

(65) Prior Publication Data
US 2024/0291804 A1     Aug. 29, 2024

Related U.S. Application Data

(63) Continuation of application No. 17/515,424, filed on Oct. 30, 2021, now Pat. No. 11,799,836, which is a
(Continued)

(51) Int. Cl.
*H04L 9/40* (2022.01)
*H04L 9/08* (2006.01)

(52) U.S. Cl.
CPC ........ *H04L 63/0414* (2013.01); *H04L 9/0852* (2013.01); *H04L 63/0428* (2013.01)

(58) Field of Classification Search
CPC .......................... H04L 63/0414; H04L 9/0852; H04L 63/0428
See application file for complete search history.

(56) References Cited

U.S. PATENT DOCUMENTS 8,259,620 B2    4/2012  Borrill
8,230,108 B2    7/2012  Pratt et al.
(Continued)

OTHER PUBLICATIONS

AFRL-IF-RS-TR-2007-180 Final Technical Report, DARPA Quantum Network Testbed, 164 pages, Jul. 2007.

*Primary Examiner* — Ghodrat Jamshidi
(74) *Attorney, Agent, or Firm* — Punita Bhasin; Bhasin Law, a PC

(57) ABSTRACT

Quantum mechanics provides several features useful for datacenter networking. The no cloning theorem, which states that it is impossible to mate a duplicate of an arbitrary, unknown quantum state, can be used to detect eavesdroppers. Entanglement allows two parties to have common knowledge of a shared state. These properties are being used today for quantum key exchange and quantum computing, but they are currently too expensive for general use. Fortunately, we can use classical mechanisms to get a close enough approximation of these quantum properties to solve some important problems in distributed computing. Nothing we describe here is quantum mechanical. Rather, we show that it is possible to use classical mechanisms to emulate some properties of quantum mechanics, which enable us to address interesting problems in distributed computing. The engineering insight, is that we can get closer to achieving these properties than might be expected through conventional thinking. The key to obtaining the properties we desire is to make the inherently asynchronous system temporarily locally synchronous tor the operations we need. In this patent, we describe how to classically emulate the parts of the no cloning theorem and entanglement that we need for datacenter networking. We then demonstrate how those approximations to quantum behavior can be used to solve important problems in distributed computing, such as 'exactly-once' semantics in an environment where failures occur and can be healed without applications needing to know.

13 Claims, 14 Drawing Sheets

Related U.S. Application Data continuation of application No. 16/162,632, filed on Oct. 17, 2018, now Pat. No. 11,196,713.

(60) Provisional application No. 62/573,196, filed on Oct. 17, 2017.

(56) References Cited

U.S. PATENT DOCUMENTS

| | | |
|---|---|---|
| 8,468,244 B2 | 6/2013 | Redlich et al. |
| 9,077,577 B1 * | 7/2015 | Ashrafi ................ H04B 10/532 |
| 9,485,172 B2 | 11/2016 | Yoshimoto et al. |
| 9,589,636 B1 * | 3/2017 | Bhavnagarwala ... G11C 13/003 |
| 9,774,401 B1 * | 9/2017 | Borrill ................ H04L 9/0852 |
| 10,326,526 B2 | 6/2019 | Ashrafi et al. |
| 10,574,461 B2 * | 2/2020 | Hughes ................ H04L 9/0852 |
| 2003/0133714 A1 * | 7/2003 | Gat ...................... H04L 9/0852 |
| | | 398/140 |
| 2009/0037451 A1 | 2/2009 | Borrill |
| 2010/0085916 A1 | 4/2010 | Yu et al. |
| 2012/0148237 A1 * | 6/2012 | Harrison ................ G06N 10/00 |
| | | 398/180 |
| 2017/0026095 A1 * | 1/2017 | Ashrafi ................... H04B 7/10 |
| 2017/0163415 A1 * | 6/2017 | Gray ................... H04L 9/0852 |
| 2019/0074911 A1 * | 3/2019 | Bitauld ................ H04B 10/70 |

* cited by examiner

Atomic Information Transfer

FIG. 13

Tree

Ring

CLASSICAL IMPLEMENTATION OF QUANTUM ENTANGLEMENT IN DATACENTER NETWORK DESIGN

PRIORITY CLAIM AND CROSS-REFERENCE TO RELATED APPLICATIONS

This application claims priority from U.S. patent application Ser. No. 17/515,424 titled "Classical Implementation of Quantum Entanglement in Datacenter Network Design," by Paul L. Borrill filed on Oct. 30, 2021; which claims priority from U.S. patent application Ser. No. 16/162,632 titled "Classical Implementation of Quantum Entanglement in Datacenter Network Design," by Paul L. Borrill filed on Oct. 17, 2018, issued as a U.S. Pat. No. 11,196,713 issued on Dec. 7, 2021, which claims priority from U.S. Provisional Patent Application No. 62/573,196 titled "Classical Implementation of Quantum Entanglement in Datacenter Network Design," by Paul L. Borrill filed on Oct. 17, 2017, the entire disclosures of which are hereby expressly incorporated by reference herein in its entirety.

This invention applies to distributed systems and computer networking for data centers of all varieties and scales.

Quantum mechanics provides several features useful for thinking about datacenter networking. Entanglement allows two parties to have common (correlated) knowledge of a shared state. Unitarity guarantees that no cloning theorem and is responsible for the fact that no information is lost. The no cloning theorem, which states that it is impossible to make a duplicate of an arbitrary, unknown quantum state, can be used to detect eavesdroppers.

These properties are used today for quantum key exchange and quantum computing, but their implementations are currently too expensive for general use. This invention shows that we can use classical mechanisms to get a close enough approximation of these quantum properties to solve some important problems in distributed systems.

Entanglement is much more than just common knowledge, so some additional justification is needed in order to use the word 'entanglement' in this protocol. Rather than overstate our claims, we will call this protocol 'mutual state coupling' (in previous patent applications we used the term 'temporal intimacy').

Nothing we describe here is quantum mechanical. Rather, we show that it is possible to emulate properties of quantum mechanics to address interesting problems in distributed computing. The engineering insight, is that we can get closer to achieving those properties than might be expected through conventional thinking, about network protocol.

We use a classical approximation of entanglement to maintain liveness and to detect when it has been lost. In particular, when a network element or the link connecting it to another network element fails, a quantum entangled state would decohere, losing its entanglement. Our classical approximation of entanglement provides a notification of the failure, replacing the complicated failure detectors used on networks today. We call this part of the protocol EARTH No-Time Liveness (ENTL).

The conventional way to replicate state is to contrive a mechanism in one machine (the master), which copies local changes to this element of information to another machine (a slave). These Replicated State Machine (RSM)'s are separate computations, on separate elements of information. Their goal is to 'synchronize' these separate and independent elements of information so they are a full copy, or clone of each other.

The mechanisms we describe here are used for specific data elements that require special handling. We call each such piece of data an Element of Shared Information (ESI) to distinguish them from data elements that do not require special handling. In particular, an ESI has two complementary halves which are logically distributed across two or more components of the distributed system and may neither be copied nor lost.

Entangled systems have more information in them than just the union of their constituents. A classical implementation cannot preserve all that information. This invention shows that with certain mechanisms, the parts it can preserve allow the protocol to implement algorithms that conventional protocols cannot.

We introduce the idea that an 'Element of Information' is shared, rather than replicated. By shared, we mean that the element of information is only complete if it is comprised of both its complementary halves. When information is intrinsically shared, we can arrange a protocol where it is impossible for one half of the information to be modified without the other half of the information to also being modified. Any attempt to modify only one half without the other is guaranteed to be detected. This is arranged, not by copying the information from one side to the other (i.e., irrevocably erasing existing information on the far side, by replacing it with information from the near side), but by making each half of the shared information complementary to the other in a reversible way.

Making an ESI foundational yields many advantages, such that the distributed system is now masterless, i.e., changes to the element of information on either side, will be atomically reflected on the other side. We can also think in terms of the computations being shared (as opposed to being replicated). Such a 'shared computation' may be viewed as a single state machine which spans the two computers, rather than two separate state machines in each computer which are synchronized as an afterthought. This enables reversibility and conservation properties, upon which we can achieve Exactly Once Delivery (EOD) by pairing it with Exactly Once Transmission (EOT), in a single atomic operation.

Reliable communication atomicity cannot be achieved without reversibility. Conventional transactions use rollback to do this as a separate operation—but what if the rollback fails?—The ENTIJAtomic Information Transfer (AIT) solves this by making the link itself reversible in a computational sense; where each side can swap their EOD and EOT roles, and make one or more operations that 'happened', 'unhappen'—as if it never happened in the first place.

The base protocols are for liveness, ENTL, and transactional behavior, EARTH No-Time Transaction (ENTT), of the shared state. The ENTL protocol silently maintains 'mutual state coupling' between two cells, eliminating the need for independent heartbeats and network level timeouts. The ENTT is the protocol that guarantees the atomic transaction nature of the link and communicates conserved AIT tokens. Any number of additional protocols may be stacked on top of these two base protocols and inherit their properties, as well as equip the protocols with additional mechanism, or decorate the link with additional state.

SUMMARY

A state of mutual state coupling (referred to as temporal intimacy in previous filings) may be constructed on a link (a bipartite communication channel) by taking the arrival or a packet containing an ESI, combining and swapping it with local information, and sending it back down a link. If the other side does the same, then we have a symmetric 'timeless' link; a classical embodiment of the correlated states of a bipartite entangled system. From an engineering perspective, we are interested in properties that can be derived from mutual state coupling; such as its potential to replace heartbeats and timeouts in distributed systems, enable atomic (all or nothing) transactions, and enable non-cloneable states which may be used to securely transfer private information (secrets) across classical systems.

We distinguish between a Local-Observer-View (LOV), where the 'vantage point' or locus of observation is on one side of the link only (Alice, or Bob, separately), a Remote-Observer-View (ROV) where Alice has intimate knowledge of Bob on the other side of a bipartite link; and a God's-Eye-View (GEV) where the entire link represents a single entity to be observed (Alice and Bob, —or for that matter— any other observer in the universe). In the case of the latter, there will be no visible evolution of the link, because the ESI and its circulating causality is trapped within the link, silently maintaining liveness, until the ESI is required for Atomic Information Transfer (AIT).

Several embodiments are possible. For example, we can use Ethernet interfaces to send packets between two computers connected by a common cable, or back-to-back connected PCIe interfaces. A special ETNL (Liveness) protocol is used to establish this timeless state. When one side (say Alice) experiences a local event on receipt of an ENTL packet, she responds by applying a simple transform and sending the modified ENTL packet back down the wire to Bob on the other end of the Ethernet cable. Bob does the same, and we now have a circulating (self-regenerating) ENTL protocol.

This is different from a conventional send/acknowledge protocol, because, once started, ENTL continues in perpetuity (until an external event—or a failure—creates change). ENTL is different also in that causality is now self-regenerating within the link, instead of being initiated by the computer on one side of the link or the other. In addition, ENTL guarantees that observers cannot see the state unless the two sides are complementary, emulating quantum entanglement by making the link temporarily synchronous.

Causality is thus a resource continually circulating in a symmetric link. It continually evolves through a recurrence enabled by the transforms applied at each end of a link, bound only by the available number of states in the ESI. This symmetry can however be broken at the macroscopic level by a process preparing the link for measurement, triggering a direction for the local flow of information and causality.

While we achieve this property of mutual state coupling by purely classical means, i.e., using technologies and explanations that are familiar to electrical engineers and computer scientists, we are also strongly influenced by Special Relativity (SR) and modern Quantum Information Theory (QIT). Our 'classical implementation' aims to achieve similar properties to those of Quantum Behavior, such as entanglement and no-cloning.

BRIEF DESCRIPTION OF THE DRAWINGS

For a more complete understanding of the invention, reference is made to the following description and accompanying drawings, in which:

FIG. 13 Shows the end-to-end picture of some possible signal transforms and encodings. The received packets on the left (bits/symbol columns) are described with some possible interpretations from the ROV (remote) LOV (local) and GEV (global) observer view perspectives. The Transform type shows examples of some potential transforms to be applied to this incoming packet, and the sent packet on the right (bits/symbol columns);

DIFFERENCE BETWEEN CAS (PRIOR ART) AND AIT ATOMICITY

Figure 1:
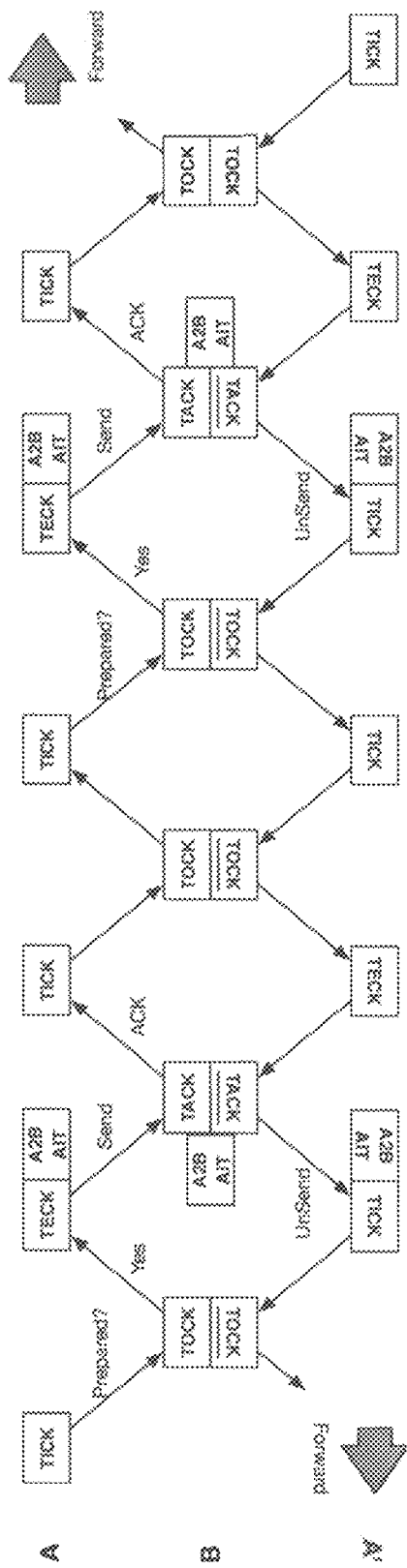
FIG. 1 depicts an example of a time-reversible protocol on the link. Turn the figure upside down, and the protocol behaves exactly the same in the forward direction as it does in the reverse direction (now forward to the right). This is an example of a symmetric protocol with the Conserved Quantities/Exchanged Quantities (CQ/EQ) property of the link.

Shared Memory Atomicity (SMA), epitomized by a CAS instruction, is all about a 'swap' between a register in a processor core, and a memory location. Many other types of atomic swap instruction are also available in the prior art, such as swapping the two halves of a register, or byte swap. Message Passing Atomicity (MPA) is all about a SWAP of information between two ends of a link. ENTT uses the minimum number of roundtrips (2-4), states in a Shared State Machine (SSM), and a minimum necessary bit in a packet, to provide the maximum physically realizable 'common knowledge' (i.e., mutual awareness) between the both ends of a link. MPA SWAP operation is a missing primitive in distributed systems, and that if implemented correctly, addresses several important problems in distributed systems, enabling us to build a so-far unrealized degree of resilience into datacenters of all varieties and scales.

Relationship to iVar's

Lindsey Kuper's Ph.D. dissertation describes IVars:

"In parallel single-assignment languages, 'full/empty' bits are associated with memory locations so that they may be written to at most once. Single-assignment locations with blocking read semantics are known as Wars and are well-established mechanism for enforcing determinism in parallel settings: they have appeared in Concurrent ML as SyncVars; in the Intel Concurrent Collections (abbreviated "CnC") system; and have even been implemented in hardware in Cray MTA machines."

Presence (or 'full/empty') pbits may be associated with memory locations so that they may also be read "at most once". In this invention, a combination of a register on one side which allows writing at most once, and a register (synchronized by our protocol) on the other side which allows reading at most once, is the CQ/EQ mechanism which enables the property of exactly once semantics. Whereas iVar's are irreversible, the mechanism in this invention is fully reversible while the token is in the link. This reversibility may optionally be extended to a local cell agent which has awareness of and is capable of exploiting this property. In the preferred embodiment, this reversibility relationship may be recursively applied up the stack and into the applications, as long as there is some entity which can control (and thus terminate) the reversibility, and trigger an immutable state within one or more cells. Across large systems, a cryptographic technique, such as an entry on a blockchain, may be used to create a globally persistent state which can no longer be reversed.

One way to treat the bits on each side of the link is to imagine that a classical model of a qubit as the combination of a 'presence bit' (pbit) and a "value bit" (vbit). If the pbit is full, then the vbit represents the current value. If the pbit is (Ø), then the vbit represents the last known current value. This is one potential embodiment implementing entangled (reversible) Ivar's. When we destroy the last known current value (for example, by randomizing it, stalling the calling process, or returning an error on a read unless the pbit bit was ¬Ø), then we have a mechanism capable of more closely emulating the no-cloning theorem. Symbols we can use to represent the presence (pbit) are empty (Ø) and non-empty (¬ Ø), or Circle (o) and bullet (•).

These 2 bits at Alice can represent only four states. The 2 bits on Bob and Alice represent another four states (a total of 8 states). However, 4 bits can represent sixteen possible states. This implies that there are more interesting ways of encoding the possible 4 bits when viewed 'together' as an entangled pair of qubits.

Treated separately we have two iVar's. But what does it mean when both iVar's (pbits) are empty—i.e., Alice is Ø and Bob is Ø? Potential answers include the following embodiments:
  1. There is no ESI present in the link (the mutual state coupling is broken).
  2. The ESI is 'currently' on its way from Alice to Bob,
  3. The ESI is 'currently' on its way from Bob to Alice.

If both Alice is ¬ Ø and Bob is ¬ Ø then the protocol is broken, and we would not achieve the no-cloning theorem. Our protocol is designed to prevent this from happening. Using the minimum set of bits described above, or by adding various forms of well-understood redundancy to the bits on the wire and in the memory to guard against corruption (a form of decoherence).

Another way to guard against the such situations is for Alice to transfer a more complete state to Bob (including her current knowledge of what she thinks Bob's state is), and for Bob to do the same. On potential embodiment allows for up to a 32-bit integer to represent Alice's state, an another 32-bit integer to represent Bob's state. If this combined 64-bit value is sent back and forth (complete with Rx and/or Tx Transformations), then either Alice or Bob can perform a verification check such that the condition Alice=¬ Ø and Bob=¬ Ø at can never occur without being detected.

While in principle this may be overkill when only 4 bits are required for the minimum ESI, the additional bits may be used to equip the link with additional mechanism to, for example, pipeline AIT tokens (increase the number which can be 'held' within the link); to extend the temporal intimacy to additional cells on an specified chain or tree; or to present it as a distributed counting mechanism which can, for example serve as a credit-based flow control, mechanism for AIT tokens or more general packet transmission flow in distributed systems.

Exactly-once semantics is achieved via this CQ/EQ mechanism, implemented with either the pbits described above, or integrated into a combined ESI described elsewhere in this disclosure. This goes beyond IVar's because (in one embodiment) the transform may use the equivalent of a Hadamard matrix for ENTL and the equivalent of a Pauli Matrix for the ENTT-which is far more elegant than a simple full/empty bit. The CQ/EQ aspects of the protocol provide the exactly one property, and the ¬ Ø (empty) symbol in the buffer provides a transitive connection through the protocol to provide a push/pull mechanism for reversible control of the AIT tokens over the link, or any recursively related entity.

Comparison with RDMA

Remote Direct Access Memory (RDMA) is a forward-in-time-only networking SMA paradigm; an attempt to extend the shared memory view of atomicity using CAS to a larger network of computers. In contrast, the Atomic Information Transfer (AIT) operation provides the missing message-passing piece tying together two systems in a bipartite pair to provide Reversible Communication Atomicity (RCA). AIT is the moral equivalent of CAS in that AIT provides true reversibility in the link, without the loss of information (coherence) in the shared memory systems on each side. An element of shared information (ESI) on the wire replaces the notion of overwriting information in the shared memory (SMA) paradigm.

Comparison with Conventional Switched Networks

When a switched network fails, or reroutes to optimize traffic, the endpoint NICs cannot just stitch the two halves of the shared state back together again, because state (including any ESI) has been lost. Such a recovery mechanism is not available through conventional switched networks because of the uncertainty of how many packets were lost, exactly where along the path through the switched network they were lost, how many were duplicated, and how they might have been re-ordered in the switched network.

This simple hazard analysis misses a fundamental issue: networks don't maintain state on behalf of applications. Switches drop packets (and state) whenever they feel like it, so there are many more ways for logical links to get confused over switched networks and compromise the integrity of the shared state.

Typical hazards include: (1) Servers with a link to a single Top of Rack (ToR) switch are unable to heal at all; there is only one path from the server to anyone. (2) ToRs represent Single Point of Failure (SPoF)s. When they fail, many servers (in that rack) also become unavailable. Worse still: the servers don't go down; they keep on computing but don't know they are isolated. ToRs have also been known to exhibit complex cascade failures where a firmware failure triggered in one will take down many neighbor TORs.

A key issue is that switched networks may drop packets anywhere along the path: eradicating state and events needed to maintain promises and liveness respectively. In our system, when a link fails, both sides are preserved. If there is a failure in the token transfer it can always be detected, and retransmissions occur only on a real failure (such as disconnection where alternative routes may be explicitly coordinated with applications), thus enforcing that the tokens have no duplicate or out of order deliveries on the link Even without failures, the behavior of switched networks forces a high over-head approach. If packets can be indiscriminately dropped, reordered, delayed, or duplicated, we have no choice but to implement TCP/IP, or something very much like it (which is unlikely to have the maturity and robustness of the existing tried and tested implementations). However, even in optimal situations, TCP introduces high overhead for all operations, which is too slow (e.g., Coherent Distributed Shared Memory Systems). There is no escape: if you have dropped, delayed duplicated or reordered packets, you have to effectively implement TCP. If we can eliminate duplication and re-ordering, recovery is far simpler, and removes the overhead from normal operations.

Links (as described in this invention) do not reorder or duplicate packets so we can now use a high-performance udp-like protocol for coherence; only paying the performance cost of TCP when it fails for real, i.e., disconnection. Remarkably, this also paves the way for very high bandwidth utilization for datacenter-to-datacenter application flows, because it eliminates the most difficult aspects of reordering and duplication of packets caused by anomalous behavior of TCP/IP.

When packets are dropped in a switched network, more than information is lost, events are lost, and it becomes extraordinarily difficult to recover both sides of a shared state that stretches across even a single switch. A directly connected link can promise three things a switched network cannot: (a) maintain an ordering of events (heal, send packets, fail, heal again, send more packets)—essential for non-idempotent and non-commutative operations. (b) not drop certain packets without notification—essential for recovery and (c) maintain complementary direction state—essential for distributed self-stabilizing algorithms.

Actually, a link can promise many more than just these three things: whatever property or mechanism the agent, actor or application wishes to equip the bipartite link object, or decorate it with state that it wishes to carry, such as CPU load, Memory, or Storage utilization, which may be used in a load balancer configuration to make decisions on distributing traffic.

The Oxford Groupoid Model

'A classical groupoid model for quantum networks' by David Reutter and Jamie Vicary (arxiv.org/abs/1707.00966—the 'Oxford semantics') presents a mathematical foundation suitable for describing the link technology described in this and prior patent filings (the 'Palo Alto' semantics).

There is no 'explicit' or 'external' mechanism for random state generation in the Palo Alto semantics. However, high quality randomness may also be emulated through the much higher rate of unsynchronized change of the entangled transfer on and active link than an outside 'observer' is able to sample it. This is the Nyquist theorem aspect of the 'deep asynchronous' design of the link. An Embodiment of a random number generator is therefore the internal sampling of the bits into a shift register, of say 128 bits (for GUID's), 256 bits (or 1K, 2K, 4K or larger) for keys, may be read as a 'sample' from the shift register by an unsynchronized external observer. These bits will achieve closer to true randomization, the more simply and directly the mechanisms are implemented in the deep asynchronous domain of the link hardware.

The Palo Alto semantics makes an explicit distinction between the timeless two-phase protocol which manages presence (liveness) in the link, and the four-phase protocol which manages the reversible transfer of the AIT token from one side of the link. However, while the ENTT protocol requires a total of four states, two of them can be harvested from the preceding TICK-TOCK states; providing entanglement is already active. This is the basis for our claim that the link is in a perpetually prepared state for transactions to occur. However, because each ENTT transfer cycle of an AIT token implies that an ENTL cycle must exist between each ENTT transaction, the effective transfer rate (bandwidth) of AIT tokens is still limited by the 4-phase protocol. Without which, we may not be able to achieve the atomicity (exactly once semantics) property of the protocol.

The Oxford semantics are directly compatible with the Palo Alto semantics with one exception that relates to implementation: In order for an implementation to guarantee the atomic property (which in turn provides CQ/EQ conservation properties supporting the exactly once semantics), the Palo Alto semantics are built on top of a two-phase ENTL (liveness) protocol, which once kickstarted, provides a foundation for entering and exiting the four-phase ENTT (Transaction) protocol, which includes the ability for internal and external reversibility. The Atomic Information Transfer (AIT) tokens, which are reversibly transported by the ENTT protocol, represent the input and output classical information in the Oxford groupoid model.

The Oxford semantics presupposes that a true quantum entangled link is an available resource to begin with, but does not describe how that may be achieved in a classical manner.

DETAILED DESCRIPTION

This invention, maintains an 'Element of Shared Information' (ESI) between two cells (nodes, computers) on a single network link or composed over multiple links. An ESI requires more than a single bit (which can encode only two states in each local hardware register, processor register or memory). When one side of a link (Alice) has the ESI (from a LOV perspective), then the other side (Bob) does not have it, and vice versa. If Alice does not have the ESI, then we must make room to encode a 3rd state, namely that the ESI is not owned on this side and is missing i.e., the register is empty (Ø). In one embodiment, if Alice keeps a shadow of the ESI (for example, that it was a binary 1 last time she saw it), then the first bit represents the presence of the ESI, and the 2nd bit represents the value of the ESI. Other embodiments encode these different states, (including empty=Ø), in any convenient mode to enable an alphabet of symbols to express the ESI, and any additional equipment or decoration desired by the kernel, protocol stack or application.

Time is represented in the link by a modulo counter. Different moduli will yield different properties (amounts of change that can be held in the link), which may be exploited at higher levels in the protocol. Because the modulo counter 'rolls over', it will bound the amount of evolution that can occur before the recurrence of the count. A modulo 1 counter is timeless (no perceived change in state on either side of the link). A modulo 2 counter (as used in ENTL) provides only 2 states (TICK, TOCK) in the recurrence from a LOV perspective, but will also be timeless from a GEV (looking at the two-half links and the media as a single entity). A modulo-4 counter, as used in ENTT, allows the expression of 4 states, and is the minimum configuration which enables a distinction in the forward and backward evolution of the protocol, and thus, the minimum mechanism for atomically transferring an AIT token from one side of the link to another. Larger moduli allow greater spans of counts; allowing extension to, for example, chains of cells and links in a datacenter environment.

Note that more complex sets of buckets and transforms can be constructed to guard against replay attacks. Fast session keys may also be constructed to thwart observers (although by definition, observation should not be possible in an ideal implementation). Byzantine (⅔ majority) consensus schemes be constructed to address both arbitrary failures and determined attackers.

We start with two registers w and x on the near side of the link (e.g., Alice), and two registers y and z on the far side of the link (e.g., Bob). The basic mechanism in the link is to exchange the 'information' in the w and x registers with the 'information' in the y and z atomically, which means that the only states that can exist is with the ESI on one side or the other, but not both nor neither.

There are several embodiments. A single logical bit can be swapped, 2 or more bits can be swapped, or two sets of 2 bits can be swapped. In one embodiment we combine a pair of bits on one side with a (local) atomic exchange (local Compare and Swap (CAS) instruction) of a local variable onto the wire, leaving the local state 'empty' (plus a shadow of what the bit used to be) in the local persistent register, and full bit(s) 'on the wire'. The other end receives these bits, and transforms them to go into the local memory—or register—and back on the wire, and the cycle continues. This exchange is atomic, because we prevent any observation of the state of the system while the bits are in transit. In essence, we make the asynchronous behavior of the outpoints temporarily synchronous, a mechanism that is key to our classical implementation of quantum entanglement.

Several encoding methods are possible. By assuming that the state on each side represents, say a bucket (2-bit column vector), we can define the transformation in a look-up table, allowing implementation of arbitrary transforms.

The ESI is designed to represent half of this information, (+1) on one side, and the other half of the information, (−1) on the other side, and arrange through the protocol for this relationship to always be complementary. The pair of states, represents a 'complete' ESI. The goal is to perpetually reverse it on a single link with the least possible mechanism. The above examples represent only some of several possible embodiments, the primary principle of which is to causally circulate continuous 'change' within the link.

Liveness (the EARTH No-Time Liveness (ENTL) protocol) is established by the perpetual exchange of an ESI in the link. One embodiment of which is to transform (exchange, swap, etc.) the contents of 'registers' on each side of the link. By combining the registers, e.g., merging a set of buckets of two bits each into two 32-bit registers or a single 64-bit register, and atomically swapping two halves of the register using a swap (or compare and swap) instruction in a processor or other (e.g., gate array) logic on each side. The preferred embodiment would be for these registers to not be in the synchronization domain of the computers on either side, but to be contained within the 'deep asynchronous domain' of the link itself.

Atomic Information Transfer (AIT) can be achieved by atomically exchanging information from the $\omega$ register with the contents of the x register (at any time). The next time the ENTL packet arrives, it will then carry this EARTH No-Time Transaction (ENTT) information onto the wire to the other side. When the other side receives it, the 'compare' part of the 'compare and swap' discovers this is no longer an ENTL state, it can extract the information by doing a swap into the z register on that side, and the transfer is complete, although the protocol requires an additional step to inform the sending side of a successful transfer. The transfer is atomic because the protocol temporarily makes the asynchronous system synchronous until the 4 steps of ENTT are complete and the two sides return to the ENTL protocol.

Two states are required for presence management (mutual state coupling), but four states are required to (reversible or irreversibly) transfer information from one side to the other. Think of the ESI as a carrier which can atomically move a bit or set of bits from one side of the link to the other.

An important use-case for this mechanism in distributed systems is to circumvent (to a large extent) the problem of 'common knowledge'. Although this is valuable in datacenters, where the link media can be more easily guaranteed to be a single segment (without intermediate elements or repeaters), it can also be used in long-haul links (for example, direct fiber between datacenters or utility equipment owned by the same company). In many respects, this provides significant advantages in dealing with latency, which is a major factor in modern networks, especially in synchronizing redundant replicas. It also provides significant advantages in reliability/resilience in communicating between different datacenters or remote control of utility equipment owned by the same company, to mitigate against various perturbations (failures, disasters, attacks).

ENTL provides the fastest possible physical mechanism for each side of a link to 'know' that the other side hasn't paused or stopped. In principle, only the speed of light (in whatever medium, copper, fiber optic cables or highly directed Microwave, WiFi or LiFi channels over the air) is the limiting factor to this 'mutual state coupling'. The ENTT mechanism provides the simplest (least mechanism) and fastest way to atomically transfer an Element of Shared Information (ESI) between one side of a link and another, and, by staging the AIT tokens persistently at each cell, or over a chain of cells, we can pre-allocate a near ideal mechanism to recover when 'something' (link or cell) fails, for example, by re-routing on a network with redundant connectivity.

Compare and set atomicity cannot be guaranteed across a switched network that can be partitioned. We need something else. This invention introduces AIT which can be guaranteed in the sense that we can know immediately if it has failed or succeeded while preventing an observation of a partial transfer.

The link represents a bipartite (Shared Information State) relationship which is self-synchronous when the ESI circulates as an ENTL token, but makes both sides of the link synchronous during the AIT token transfer phase of the ENTT protocol. From a communications perspective, this ENTL token acts like is taking a full-duplex link and making it half duplex. We use this property when we want to send AIT tokens, to guarantee their atomicity. Typically, there will be two ENTL packets circulating (one initiated by Alice, and one initiated by Bob) in which individual 'Elements of Shared Information' (ESI) are maintained with an appropriate protocol to ensure their conserved property. State (bits) on either side of the link is maintained to keep track of (a) whether this side of the link has the ESI or not, and (b) what the most recently known value of the ESI is.

If Alice's Half-Link holds Ø, then Alice may also keep track of the last or most recent value. This plays an important role in the function of the link. If we no longer have the ESI, but we remember the old value, then we can compare what the new value is when it comes back from the ether side, i.e., we can determine whether it is a surprise, or not—e.g., something not expected. This is how we build up the basic TICK/TOCK operation. With more bits (e.g., ≥4) wo can build up the ENTT and higher levels of conserved quantity protocols. In principle, a register of any width can be used. Smaller widths will transfer fewer bits and be more efficient. Larger widths provide room for additional conserved quantity functionality, for example, to extend the protocol to enable credit-based flow-control schemes on a multi-hop network. In credit-based flow control, the sender must have a credit from the receiver before sending a packet. An alternative mechanism, back pressure, has the receiver either report collisions to the sender or return packets until the receiver has room.

If the value of the returning ESI comes back from Bob is the same as the previous value sent by Alice, then we may have an event (i.e., the arrival of a packet, which causes an interrupt or some other means of notification in the receiver such as polling) but we do not have a change in information. This is a modulo-1 or TOCK-TOCK protocol. If the value of the returning ESI is not the same as the previous value known to Alice, then we have both an event and change (a surprise). We call this a modulo-2 or TICK-TOCK protocol.

An important aspect of the design is how we distinguish normal information (e.g., bits stored in memory), from shared information. This is where the disciplines of physics and computer science can differ. The ESI represented by ENTL and ENTT, is shared, i.e., if one side has this state, then the other side does not. Information is the answer to a YES/NO question.

The ESI represents a 'shared' state between the two cells. One embodiment is for Alice to combine her (local) state, with what she sees as Bob's (remote) state and combine them into a single state that fits in the register. Nominally, the 2 bits on each side needed to emulate a qubit provides 4 bits in total that can be sent back and forth. However, perhaps a more efficient embodiment can be made by thinking of this as Alice exchanging one of her 2 bits with Bob and Bob doing the same. In effect, there appears to be only 3 bits: the last independent value seen on both sides of the link, and the shared bit, which bounces back and forth using ENTL protocol. Even more efficiently, we could consider only 1 bit of information as shared, but each side has a full/empty bit (described later) which says that they currently have "the" bit. The preferred embodiment is shown in the table in FIG. 13, and described as two buckets, each containing two bits of information.

Figure 6:
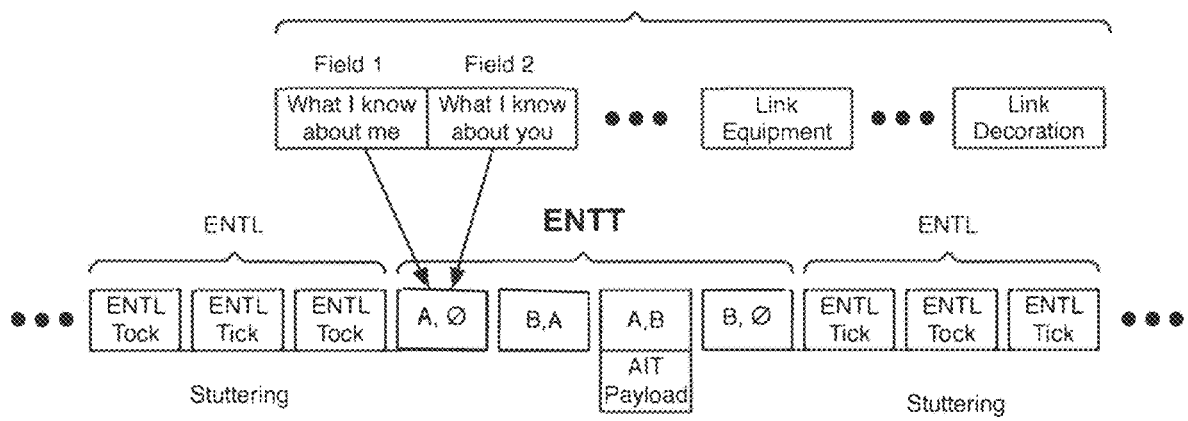
FIG. 6 shows a stream of packet exchanges (lower line), going from ENTL (liveness) to an ENTT (transaction) and back to an ENTL (liveness) phase. The packet contents show the two 'buckets' (Field1, Field2) and may include extensions to the packet, which we refer to as 'equipment' (attached mechanism) and 'decoration' (attached state)

The purpose of a link is to provide mutual state coupling between two interfaces (cells). This creates a 'Reversible Protocol': using a pair of 'Information Buckets', an ESI is constructed by sending a 'pair' of information buckets back and forth, as fast as possible in a causally connected way; i.e., a packet coming out of A toward B is caused by a packet coming out of node B toward A in a circular fashion. The first bucket contains the current sender's information [what I know about me], and the second bucket contains [what I know about you] (FIG. 6). Buckets may be empty or contain one or more pieces of information (including a representation of an alphabet (bounded set) of symbols, such as +1, 0, −1 and √−1). We refer to Alice on the near end of the link, and Bob on the far end of the link. Alice and Bob swap the buckets or the internal contents of each bucket, before sending them back, so that their orientation is reflected in the direction of the packets (e.g., towards or away from this local observer, which can only be known from an LOV perspective or vantage point), as shown in FIG. 1, including the 'reversible' orientation of the protocol. A is Alice in the initial forward direction of the protocol. A' is Alice in the new forward direction of the protocol. The labels and the orientation of the figure is arbitrary: left can mean forwards in time, or right can mean forward in time The current orientation is marked by referring to A or A' as the current 'vantage point'. The point is that the direction if time is indistinguishable by the fundamentally symmetric nature of the protocol. i.e., any AIT token that can be sent can be unsent. ENTT is a 4-phase protocol (stand-alone), or when proceeded by one TICK-TOCK cycle of ENTL, it comprises 2-phases (still a total of 4). The first two phases may be considered the prepare phase. When ENTL is active, the link is perpetually prepared (for use by, for example, network assisted transactions, Paxos or other consensus protocol).

The two buckets containing the [what I know about me], and the [what I know about you] pieces of the ESI are represented mathematically as sets where each bucket contains its vantage point set, which can be empty, or contain two or more bits, in the link's equipment (i.e., what we can fit in the minimum packet size of any implementation, such as 64 bytes in Ethernet. Arbitrarily small buckets (down to 4 bits in a dedicated implementation) may be used as long as the embodiment guarantees atomicity. Buckets are swapped selectively in the transform on each side. Alice maintains Mutual State Coupling (MSC) with Bob (i.e., circulating causal change) by taking the bits that arrived in the ESI, and swapping them with the local bits if and only if the local information is the same (the cswap).

Figure 2:
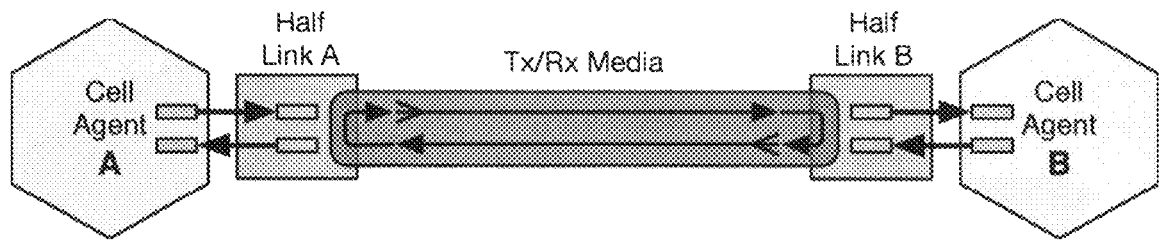
FIG. 2 depicts the key elements of a link, with the simplest (least mechanism) ENTL packet circulates in the Tx/Rx media, and the Half-Links on each side which are ready to capture changes to the ENTT protocol and atomically transfer AIT tokens from one cell to another.

FIG. 2 shows the basic link architecture. It comprises the transmit/receive (Tx/Rx) media in the center, plus the two Half Links on either side. A mechanism exists at either side (just inside the Half-Link) to detect the type of packet, and to automatically transform (swap) and return the packet if the type is ENTL. The recirculating arrows inside the media indicate that these events and shared (circulating) information is completely hidden.

From each Cell Agent's perspective, its Half-Link can be a potential source of recurring events, a 'clock'. Normally it does its 'TICK-TOCK' silently, until the agent on either side of the link does a push to the register in the half link. The counter in this 'clock' is constrained, for example, in one embodiment, to modulo (e.g., 2) evolution. Typically, the receipt of an ENTL packet is treated as a TICK, and the retransmission of the (transformed) packet may be treated as a TOCK. Alice's TICK may therefore be Bob's TOCK. The arrangement is symmetric: each side of the link thinks it is Alice from its LOV, and the other side is Bob. This is one of several possible embodiments.

The Hidden ENTL Packet Protocol is 'timeless', but nonetheless maintains MSC through the exchange (causal circulation) of packets (at the lowest level of embodiment possible in the available technology). This is a basic resource we can hang higher level operations on in a system of distributed nodes (cells). This 'ENTL packet is circulated at the lowest possible, simplest (least mechanism) level in the link between two parties: Alice and Bob, ideally, on the very edge of the hardware that recognizes the packet types as they arrive. If the type is ENTL, it transforms (swaps) and sends it back down the link to the sender. The sender is now the receiver, and it recognizes ENTL, and does the same. This continues until an agent on either side wishes to send an Atomic Information Transfer (AIT) token.

Figure 3:
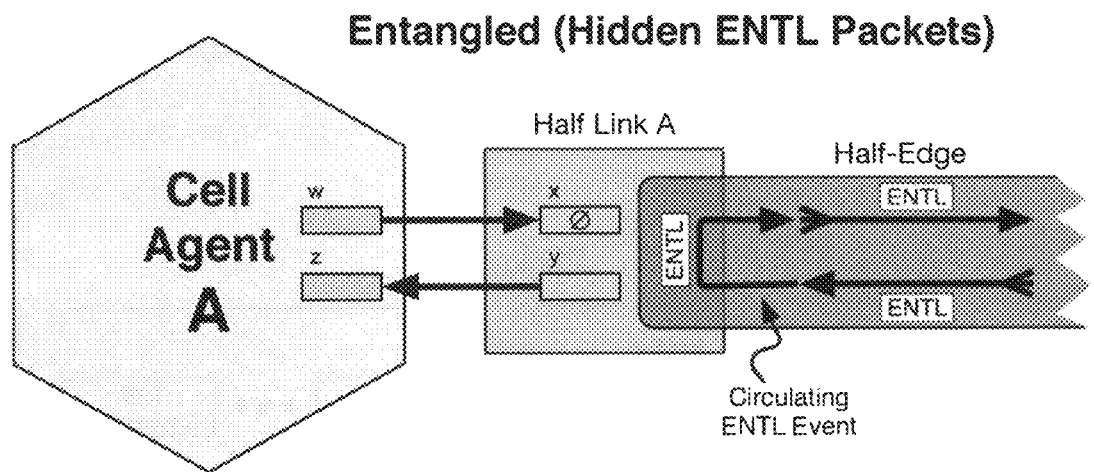
FIG. 3 shows a more detailed view of the relationship between the bare link within which the ENTL event circulates, the Half-Link containing register x which when $\neg\emptyset$ holds AIT tokens to be exchanged for the next ENTL token and sent over the wire. Register y is filled when an AIT Token is received, and the cell agent A is notified by transferring the AIT token to register z. This process is completely reversible, with coordination from the local Cell Agent A.

The hidden (self-circulating) ENTL packet mechanism is shown in FIG. 3. ENTL is organized to be as free as possible from any clock synchronization on both sides of the link. In effect the link is its own clock, with its own characteristic period depending on the length of the cable and the amount of 'mechanism' needed to recognize and transform the packet, and to send it back down the Tx/Rx media. This ENTL mechanism is self-generating (once started), and is (intentionally) exquisitely sensitive to packet loss.

In practice, many implementations, especially those which use standard Ethernet Network Interface Controllers (NICs), will compromise this 'deep asynchronous' property in order to be compatible with legacy interfaces. While it may still be possible to extract some of the benefits of quantum protocols under these conditions of compromise, the preferred embodiment is to use the minimum possible mechanism compatible with this 'deep asynchronous' property to enable a more faithful representation of the physics that will more reliably, and securely, yield the properties we wish to exploit for general use in distributed systems.

It is important to notice the various synchronization domains in the implementation. Normally, a NIC will synchronize its registers and buffer memory with its local CPU (i.e., the Cell Agent), and independently, synchronize the bits it sends on the wire with a separate clock associated with the standard it wishes to conform to (e.g., 1/10/25/40/50/100/200/400/Gbit or 1 Tbit (and above) Ethernet transfer rate). In the figure(s) above, however, the preferred embodiment would have no synchronization whatsoever (i.e., it would not cross any clock domains). The only synchronization signal would be the leading edge (change) in the signal on the media indicating the arrival of information at Alice's receiver. In electromagnetic terms, this represents the arrival of one or more (typically very many more) photons. The same would be true on the opposite end on Bob's receiver. We refer to this complete lack of external sources of synchronization in the Tx/Rx Media and Half-Links as the deep asynchronous domain.

A link comprises two Half-Edges, each Half-Edge includes the connection to media. The link is equipped with basic mechanisms to hide the state of internal packet exchanges on the media when executing the ENTL (liveness) protocol.

While the mechanism inside the Half-Links is self-contained, on each receipt of the ENTL packet, it checks the input register (x) in the Half Link to see if the local Cell Agent wishes to transfer data. If it is empty, the ENTL packet is transformed, and sent bank down the link to maintain the timeless (mutual state coupling) state.

This simple description may be extended to provide a variety of functions which emulate quantum behavior. The link may be equipped with a protocol type and various types of transforms. Any number of tokens may be carried by a link, constrained only by the physical resources provided in the embodiment of the Link.

Information is change. If it doesn't change, it is not information. Observation on one side of the link involves the transfer of information from the Cell agent (register w) to the Half Link (register x), or the Half Link (register x) to the media in FIG. 3 (blue communication channel). A concept of 'copying' is problematic, it will not serve our purpose of emulating entanglement. Instead, the ENTL and ENTT protocols are designed to work together to enforce the Conserved Quantities/Exchanged Quantities (CQ/EQ) property. Observation does not mean copying information, it means removing it. Once observed, the information is no longer part of the link, and the MSC is broken. When one side of the link takes this information, the mutual state coupling will be broken—for both sides of the link—(or at least 'stalled') until this (or a new) piece of information is given back. In the preferred implementation, the information (binary 0/1 or Tick/Tock) may never appear in memory, or even a processor register. It will be 'trapped' within the interface, or in the circuitry as close as possible to the wire where the reception/transmission takes place.

ENTT (Send AIT) Packet Protocol

Figure 4:
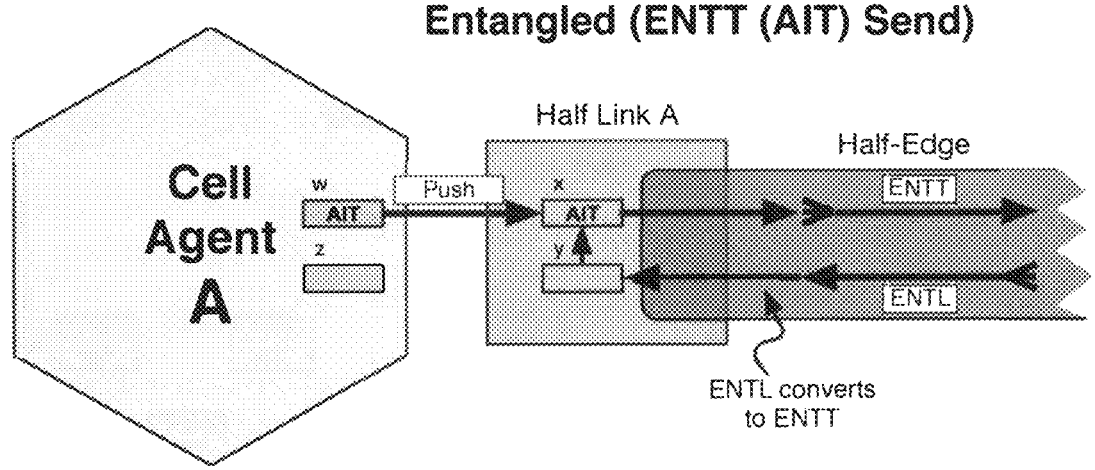
FIG. 4 shows how the local Agent irretrievably pushes the AIT token into the Half Link (into register x for transmission on the next ENTL cycle). Register w is left with $\emptyset$, ensuring the CQ/EQ property of the link. With the token now in the x register waiting for the next ENTL packet to arrive and the liveness ESI replaced with a transaction ESI. When the Token is placed on the wire, the x register now contains $\emptyset$, and the new ESI is now on the link on its way to Bob.

FIG. 4 shows that if the input register (x) from the cell agent register (w) contains an AIT packet, then the ENTL packet is replaced by an ENTT packet, which initiates the 4-phase (locally reversible) protocol to "transfer" the AIT token from this side of the link to the other. Once the ENTT protocol is complete, the ENTT packet is replaced by an ENTL packet to terminate the transfer, returning the link to its timeless state. In cases where the Cell Agent may indefinitely delay completion of the AIT transfer, an embodiment with a different type of ENTL packet may be employed to monitor liveness in the middle of an ENTT transfer (where the Cell Agent is thinking).

Figure 5:
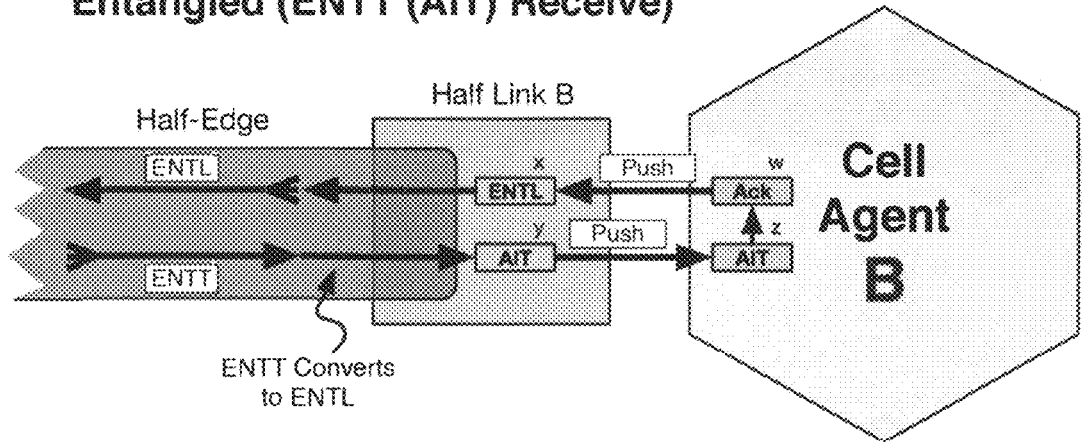
FIG. 5 shows the receipt of the ENTT packet, with events into the Half Link recognized as a push of an AIT packet into the half-link, with an event notification to the Cell Agent B. When the Cell Agent B retrieves the AIT token, it replies (immediately—with no blocking) with an Ack (TACK) which is pushed into the Half-Link to 'close' the transaction with the transmitting end. This process is completely reversible with coordination from the local Cell Agent B.

Receiving an AIT from the other side of the link is shown in FIG. 5.

ENTT Implementation

The key to both ENTL and AIT is to make the system unobservable for the duration of an event, such as the interval between sending an ENTL token and the processing of it by the receiver. It is as if we are making time discrete, in the sense that observations can only take place before or after certain intentionally observable event boundaries. We implement this property by making the appropriate parts of the asynchronous system synchronous for required steps.

Alice cannot change her state until she hears from Bob, and similarly for Bob. This behavior guarantees that Alice's and Bob's states are complementary after processing a received ENTL token. The emulation of entanglement comes from not allowing either Alice or Bob to change state until the received token is processed. Any violation of the desired behavior can only happen between the sending of an ENTL token and the processing of it, but the protocol makes that interval unobservable. Except for the initial step, when Alice knows nothing of Bob's state, the protocol guarantees that their states are complementary at every event boundary.

A key reason the interval is unobservable is that the link is a dedicated resource between Alice and Bob. If Alice and Bob take no action during the interval, and there are no other observers of the link, then there is no observation of an intermediate state. This dedicated link also gives us the part of the no cloning property that we need. In a true quantum system, a third party could observe the link, but that observation would change the quantum state, which Alice or Bob could defect. Our protocol prevents a third party from observing the link, which gives us the desired property without quantum mechanisms.

Atomic Information Transfer (AIT)

While ENTL is stateless, in the sense that it has no externally observable state, AIT allows us to extend the common knowledge to layers above the network. The essence of AIT is to update the state on the two sides of the link so that information that was initially only on one side of the link is only on the other side at the end of the protocol. Importantly, should anything prevent the transfer, the result is that the token is only on the initial side, just as if the transfer had never been attempted. This transactional behavior arises directly from our classical implementation of the needed properties of the no cloning theorem and entanglement.

FIG. 6 shows the packet format in one embodiment. The first field contains, from an information perspective, "What I know about me", the second held contains "What I know about you". Symmetry is ensured by an internal swap of these pieces of information by the receiver before the packet is returned. The ENTT protocol has four phases.

- [A, Ø] Initiation: Bent by Alice. A=vector, e.g. {01}. Alice is ready, Bob may not be. While the ENTT protocol requires a minimum of four states, if the link is already entangled, the preceding cycle of [TICK-TOCK] in the ENTL protocol can replace the first two (prepare).
- [B, A] Bob swaps fields and adds B=vector, e.g. {10}. Alice is ready, Bob is ready.
- [A, B]+[AIT] Alice swaps fields, appends AIT Token. Optional payload (≤max packet size) may be appended.
- [B, Ø] Bob removes the AIT Token, indicates by filling with the empty Ø state.

Figure 7:
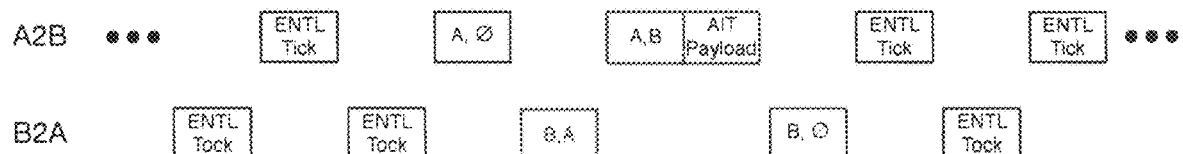
FIG. 7 shows a simple GEV view of the stream from Alice's perspective (A2B), and from Bob's Perspective (B2A), showing how the pairs of buckets, and AIT token are 'bounded' by ENTL (liveness/shuttering) on both sides.

FIG. 7 shows which packets are sent by Alice and which packets are sent by Bob. It is essential to note that the exchange must be terminated returning to the ENTL TICK TOCK protocol for at least one cycle before sending another AIT token. Each packet contains a pair of buckets: the [what I know about me] bucket, AND the [what I know about you] bucket.

AIT Unsend (Internal Reversibility)
Instead of a successful AIT transfer,
[[A, Ø] [[B, A]] [[A, B]+[AIT]] [[B, Ø]]
there are three reversal points for incorrect protocol detection:
[[A, Ø]] [[−B, A]] [[−A, −B]] [[Ø, Ø]]—Negative, Bob-failed, not ready.
[[A, Ø]] [[B, A]] [[Ø, B]] [[Ø, Ø]]—Token not available, Alice-failed, cancel send.
[[A, Ø]] [[B, A]] [[A, B]+[AIT]] [[Ø, Ø]]—Token not accepted; revert to sender.

AIT External Reversibility

We begin with an AIT token owned by the sender. The ENTT protocol sends the AIT token in the first phase of the protocol without a prepare ("are you ready") phase—which is implicit in the ENTL TICK-TOCK liveness protocol. The response from the receiver on receipt of the first ENTT packet is to store the AIT token and any logical variables associated (piggybacked) with it. The protocol proceeds through the 4 states in the shared state machine (SSM), with each transition representing an event sent over the wire in a packet. If any one of the packets are lost, the SSM will stall, with the two sides or the link off by at most one packet.

A hazard analysis of the loss of each transition is matched to a specific mitigation in the recovery protocol (which may simply be re-establishing mutual state coupling on the same link, or routing around via other cells to retrieve the state that was stalled in the other Half-Link). The mutual state lost by a failed node can be reconstructed because we know it is complementary to the state that is held on the other side of the failed link.

Once the AIT token has gone through, the owner no longer has any control of it (a higher-level protocol may in a different embodiment), particularly after the ENTT protocol is finally flushed by a cycle of ENTL. However, if the receiver has a problem, such as failure of its local application, it can "push" the AIT token back to the sender as unprocessed. This resets the link, for that AIT token, back to the state it was in before the transfer, i.e., it reverses time on that link. Whatever can happen in the AIT protocol, can unhappen.

Figure 8:
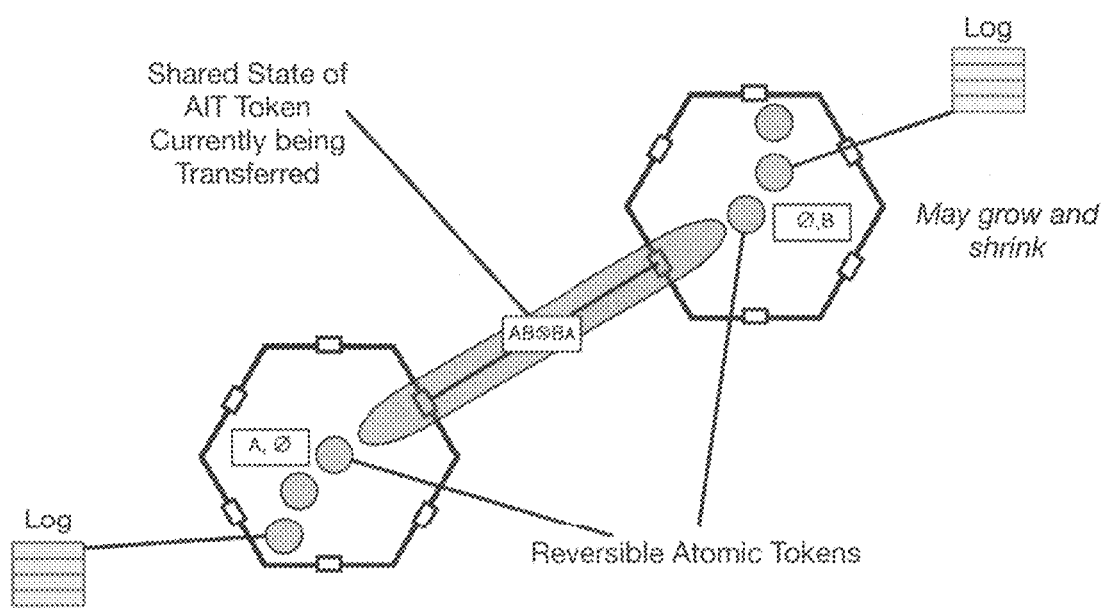
FIG. 8 shows multiple AIT reversible tokens may be pipelined in the link. A log (or queue) of AIT tokens on both sides can grow and shrink, but the combined capacity of the logs on both sides is a constant—reflecting the CQ/EQ property of the link.
Figure 9:
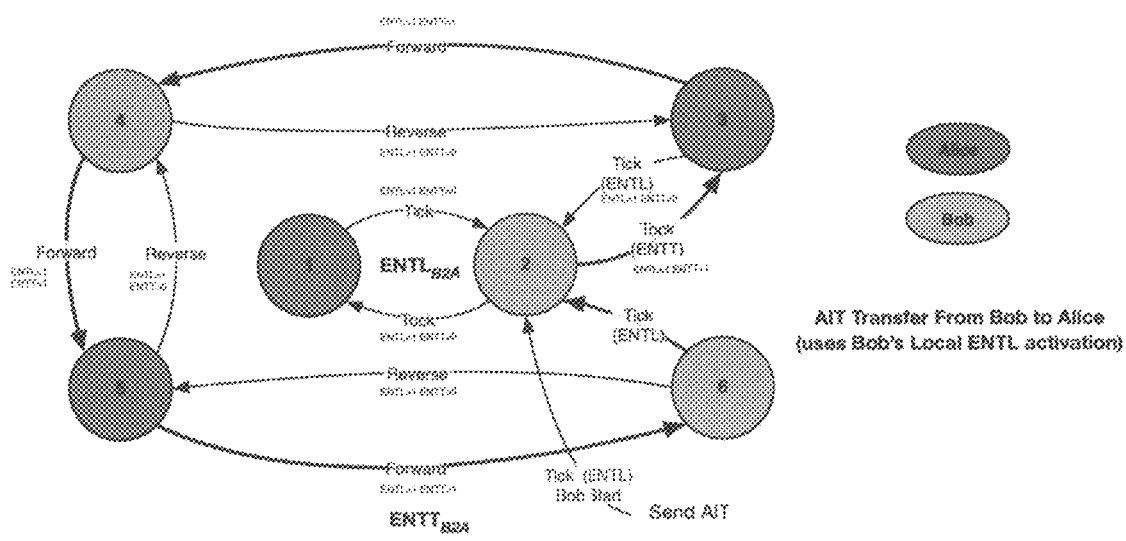
FIG. 9 shows the view of the link from Alice's perspective. The 'timeless' Tick-Tock (liveness) protocol continues in perpetuity (States 1 and 2). When Bob sends an AIT token, the Tock transition carries the AIT token with it to state 3, and around the path (states 4, 5), finally receiving an acknowledge that the AIT token has been received by Alice (state 6), and returning to the Liveness protocol.
Figure 10:
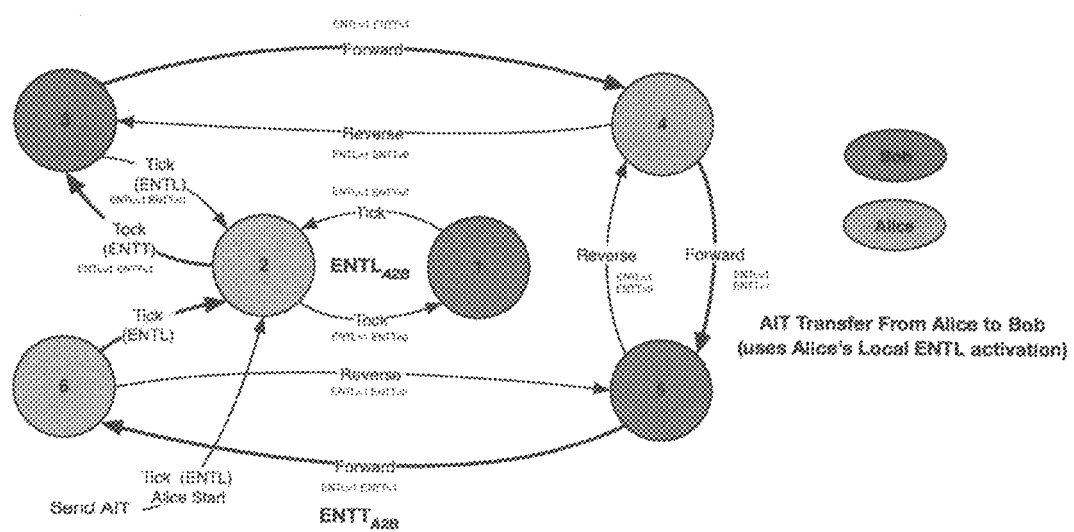
FIG. 10 shows exactly the same arrangement in the previous figure, but this time from the view of the link from Bob's perspective.
Figure 11:
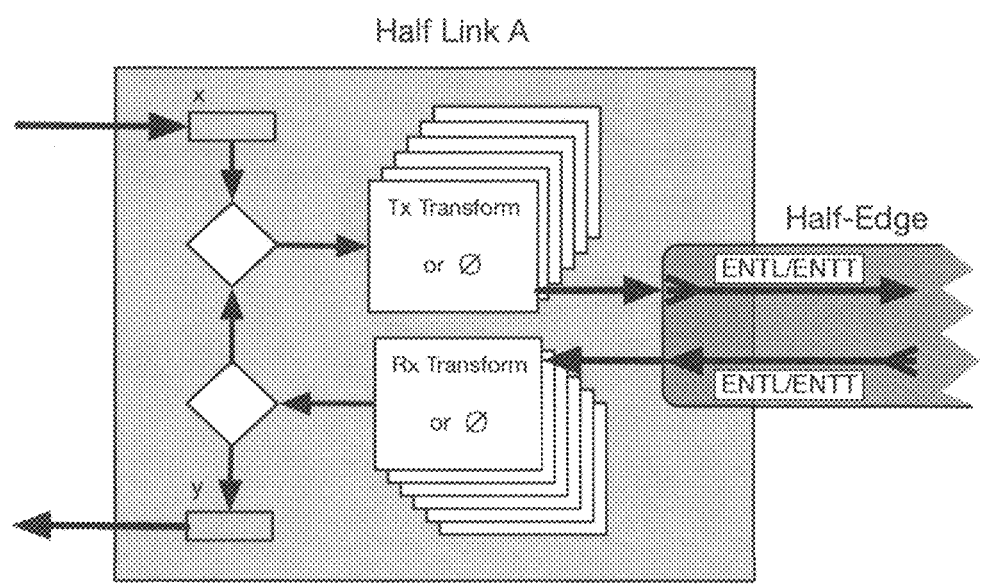
FIG. 11 depicts the inner mechanism of a Half Link, showing the set of Rx Transforms which may be applied to an incoming packet (depending on the packet type and subtype). The comparator decides if the incoming packet is a liveness packet, which proceeds directly to the output comparator, or a transaction packet, which deposits the transaction (AIT) token in the y register in the Half-Link (which in-turn generates an event into the Agent). The output comparator (on receipt of a liveness packet event), tests the x register from the Agent to see if it contains an AIT token or is empty (Ø)
Figure 12:
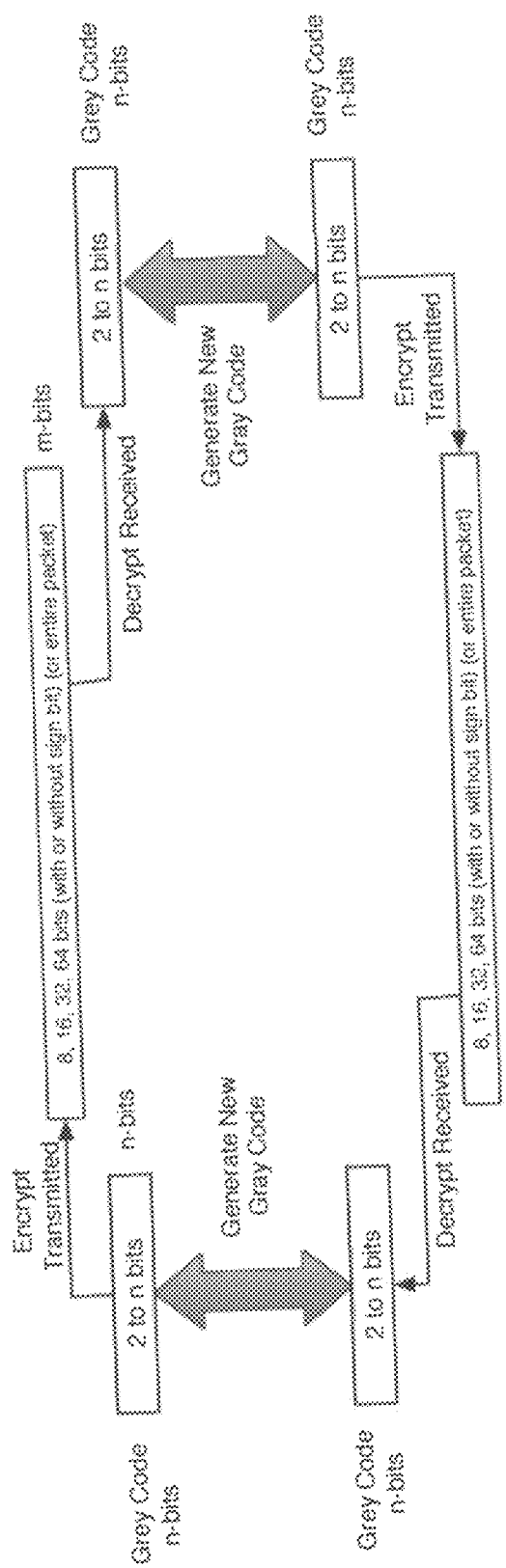
FIG. 12 shows the self-sustaining Loop of Transform, Send, Send, Receive, Transform (this time with the transform depicted as a Grey Code generation)
Figure 14:
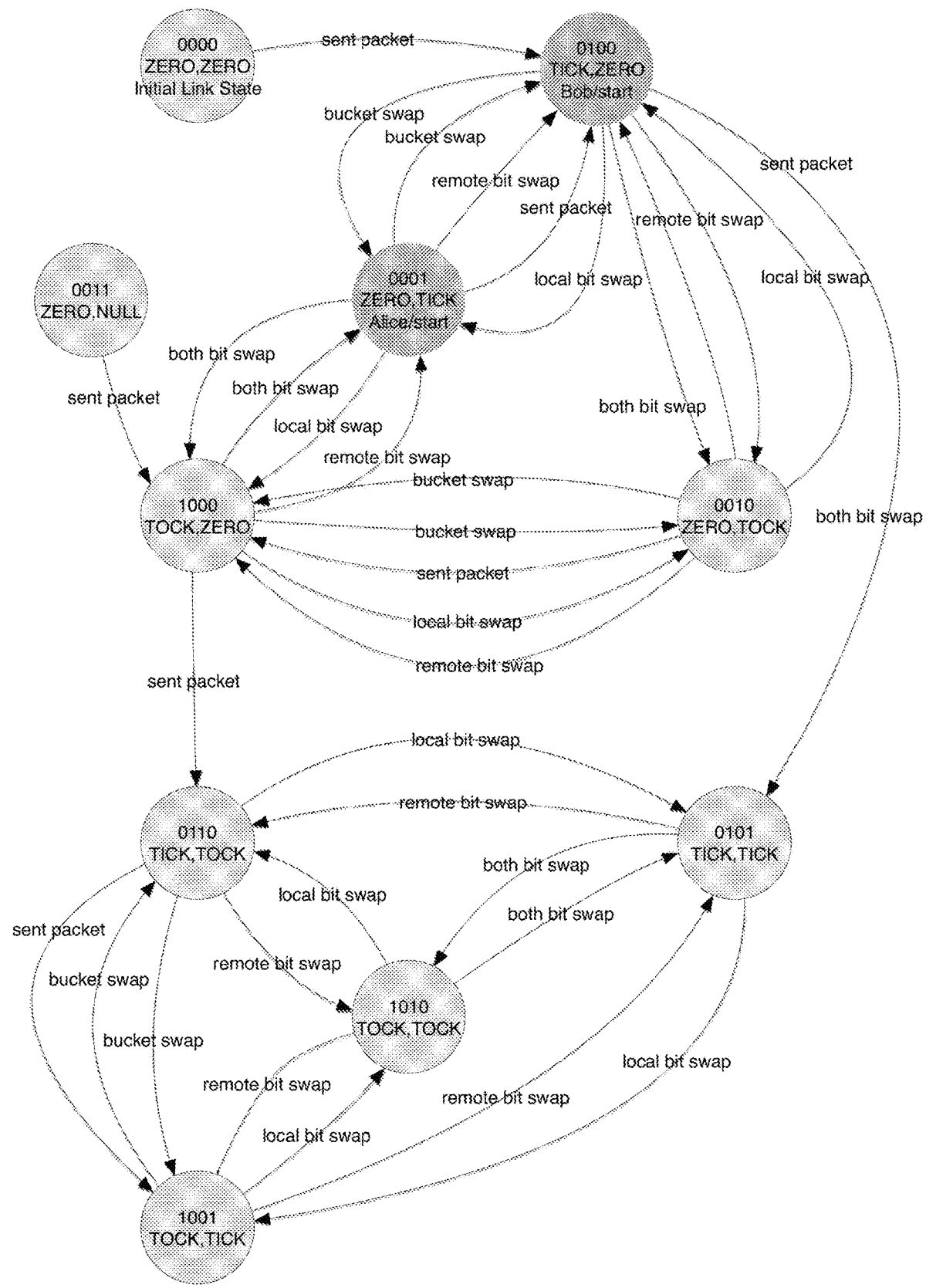
FIG. 14 shows a state diagram derived from the table in the above figure. This is redundant with FIGS. 9 and 10 above, but included for completeness.
Figure 15:
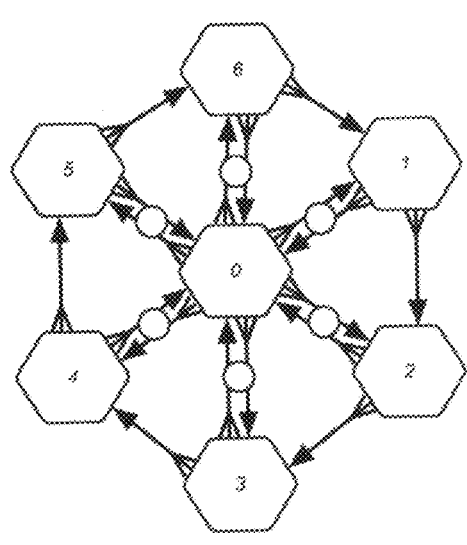
FIG. 15 shows two possible compositions of mutual state coupling. The first (Tree) shows a root cell for an entangled tree which has direct (one hop) awareness of its neighbors through the ENTL protocol, and can (with a higher-level Tree Token), manage consensus with its neighbors, and automatic failover to a preselected (by the root) cell in case of failure. The second (Ring) shows a circular composition of mutual state coupling initiated by cell 1 (which is the terminal and the terminus for the circulating packets around the ring). Tree and Ring mutual state coupling is enabled by 'equipping' the ENTL with additional information. Cell valency bounds the size of the ENTL packets needed. The circles on the links represent those sets of links which need to be entangled in order to perform this function.
Figure 15:
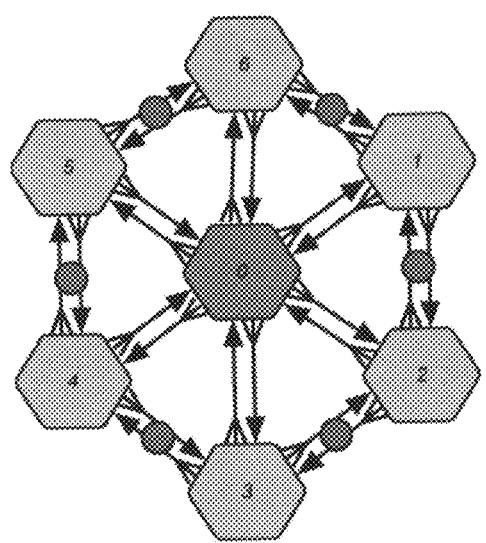

Multiple AIT tokens may be pipelined, i.e., while only one may be concurrently active on each link, multiple tokens can be sent over a link before the first one is processed at the receiving end as shown in FIG. 8. Multiple AIT tokens may also be in transit over a chain of links.

To be pipelined each AIT token must have its own identity. This enables an unlimited number of AIT tokens to be transferred (limited only by the local capacity of the Half-Links), and it enables recovery should the link fail and the healing algorithms route around the failure and need to 'reconnect' the Half-Link's on the new path.

Each ENTT Transfer of an AIT token must be interspersed with at least one cycle of ENTL on the link to flush the reversibility phase for the initial transfer. This means that the sending side can no longer retrieve the AIT token. However, the receiving side can still send the AIT token back if it discovers a reason to do so before it is processed by the application layer.

Multicast AIT Tokens

A single AIT token can be transferred from a source to a target cell over a chain of links in much the same way as it is done between adjacent cells. We add an additional mechanism to manage the delivery of an AIT token 'set' to multiple intermediate points along the chain. The principal advantage is that the atomicity property we obtain from the Conserved Quantities/Exchanged Quantities (CQ/EQ) mechanisms can be used to account for delivery to multiple (possibly unknown number of) endpoints in the presence of failures and recovery. There are multiple embodiments:

Send separate AIT Tokens which are (successively) retired by each cell along the path. When there are no more destinations, the AIT transfer ends, and the group transaction will be complete.

Send a single AIT token with a "count", allowing each cell to decrement the count. If the count does not go down to zero, then either an error occurred, or one or more members departed from the group. Either way, this provides a highly efficient way to do reliable multicast.

Send a single AIT token on each port of the sender. When the outgoing token reaches another cell, creates a new AIT token for each child of that cell. It does this until each of the AIT tokens reaches a leaf. At the leaf, a return AIT token is reflected back, and accumulates information on each intermediate cell. Branching cells wait until all of their children have responded, and then send a 'summary' token rootward. When the root finally has all response AIT tokens, it now has a complete picture of the cells which responded.

AIT tokens are transactional at each step, so it is not possible for a failure to occur that is not immediately detectable, because the composition as a whole is effectively a staged, coupled, synchronous control tree.

Multicast Group Membership

Figure 20:
FIG. 20 shows 'chain entanglement', where the ENTL packet is equipped, with additional information to compose the entanglement over two or more links. One example may be an identifier which sweeps the set of cells and links in a 'ring'—with a turnaround at the cells at each end of the chain. Another example would be for one cell to initiate an operation inviting other cells to add countable information to a data structure in the ENTL packet; for example, in the form of a bit mask, counter, list of cells or other form of data structure, to keep track of the current membership (and liveness) of the cells around the loop on the chain. This may be used to keep track of cluster membership for applications. The ENTT and AIT token protocols may be composed in a similar way.
Figure 21:
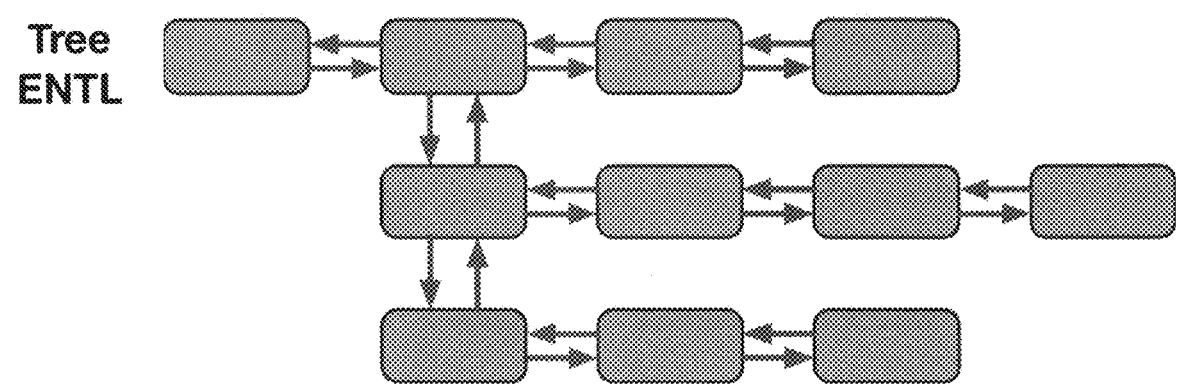
FIG. 21 shows a generalization of chain entanglement, by equipping the ENTL packet with additional information to compose the entanglement over a tree of cells and links. In the same way as chain entanglement, liveness and membership status may be extended to all the cells on the tree. The ENTT protocols may be composed in a similar way, but there may now be two or more AIT tokens sent as a 'set' to be captured exactly once, by one or more of the members of the tree.

Multicast Group Membership is described here for cells configured in a tree in which each cell has one parent and zero or more children. Other embodiments are possible. Membership is moderated by tree subscribe and unsubscribe, shown in FIG. 20 and FIG. 21. Publish sends a message from the root recursively to all children. Those cells that wish to subscribe send a Subscribe message to the root. The root then sends the subscription information on each port that received a Subscribe. Likewise, the root also forwards the subscribe notification to each branch that has members already on it. In this way, subscribe is always confined to the current set of members, and each member knows 'how many' members there are in the set (but not necessarily their identities).

The unsubscribe protocol allows a cell to voluntarily withdraw from the set, notifying other members on that tree in a manner similar to the subscribe protocol. If a cell fails, or is involuntarily prevented from sending an unsubscribe, then there will be circumstances where subscribe packets will reach a cell that no longer is a member of that set, in which case it may end up being forwarded, and caught by the leaves. Leaves, which are not bona-fide members of the set, will send a root cast notifying the root of the failure down that branch.

Extended Processor Instructions

In order to provide the fastest and simplest possible mechanism for a processor to exploit the properties of the link, we propose the extension of processor instructions (read, write, or any other), to include several kinds of acknowledgment (e.g., local operation succeeded, link operation underway; local operation succeeded, link operation succeeded; local and link operations succeeded and remote operation succeeded, etc.), instead of just 'memory error'. These extended processor instructions may be invoked by programs written in languages such as RUST to reliably extend notions of ownership and borrowing over the link, and control the number of AIT tokens to be sent or consumed, as described in the multicast AIT tokens above.

Event Atomicity and EQ/CQ Conservation

It is normal in computer communications to generalize the notion of a register (a vector of bits) to a buffer (a vector of registers). And to describe the process of information transfer as a conserved operation, swapping a full slot in a transmit buffer on one cud of the link for an empty slot in the receive buffer on the other end of the link. In a very real way, our value of empty (Ø) represents the notion of this transmit buffer slot being empty. We extend this notion of conservation to provide quantum-like (no-cloning) behavior.

The link is equipped with a property we call Equal Quantifies/Conserved Quantities (EQ/CQ). Because the transfer of an AIT token requires an ENTL packet to be replaced by an ENTT packet in order to trigger the transfer, and after the transfer, the ENTT packet to be replaced by an ENTL packet, we have an EQ/CQ system.

Unlike conventional protocols which may involve the loss, delay, duplication or reordering of packets, and require an indeterminate number of retries, the ENTL/ENTT protocol facilitates recovery and maintenance of these conserved quantities. This in-turn enables applications in the layers above to, for example, enjoy exactly once semantics in their distributed algorithms. EQ/CQ also enables a classical Embodiment of the no-cloning theorem, which in-turn, supports the properties needed for Network Assisted Transactions (NAT).

Our AIT protocol incorporates the CQ/EQ mechanisms to guarantee Exactly Once Deliver (EOD). We achieve EO semantics, not by some combination of idempotent transmission or reception, but by the ENTL liveness protocol preceding the ENTT transaction protocol, and back. In this way, we ensure that the tokens themselves (particularly the AIT tokens) are much more strongly safeguarded in the system, through failure and repair.

The combined TICK TOCK protocol is a two-party swap. The TICK transfers Alice's information to Bob, and the TOCK transfers Bob's information and the last known Alice information back to Alice (both from Alice's perspective).

Encodings

The preferred embodiment 'shares' a 'small number' (2-4) of bits as a circulating ENTL token on the wire between two cells using any encoding scheme available (e.g., Pulse Code Modulation, Pulse Amplitude Modulation, etc.), and any protocol where events are recognized at each end of the wire and captured as discrete bits. A single protocol slot which transfers one of 16 states on the wire 'at once' is ideal, but sharing those 4 bits over multiple protocol slots may be necessary when confirming to existing interconnect protocol standards, such as Ethernet, Infiniband, GenZ or Omnipath.

A practical embodiment would be to transfer this information between registers on each side (e.g., a standard 8-, 16-, 32- or 64-bit integer) between the registers w, x, y and z (see FIG. 3, FIG. 4 and FIG. 5). For example, the register x will hold a 'value' of empty (Ø) as long as there are no AIT tokens to be sent. Note that this is different from the binary representation of zero. This means we now have (at least) three states that need to be represented in each register, Binary 0, 1, and Ø. One embodiment is to use two bits for each register. One bit represents presence, whether the information in there or not (pbit); the other bit represents the value if it was there.

One's complement has two ways to specify zero (00000000 and 11111111—e.g., an 8-bit byte). We could use the first (00000000) to specify zero (0) and the second (11111111) to specify empty (Ø). This works for registers of 2 or more bits.

There are several possible interpretations of 'transfer' in this context. It could mean overwrite i.e., register w overwrites register x when it wishes to send an AIT token. It could mean that our 'shared' information is currently (from an LOV perspective) in w, say 11 or 10. Or it is not currently in w, it is in x (or on its way down the communication channel); in which case the representation left behind in w is encoded, as 01 or 00.

Another interpretation is that the contents of w and x are 'swapped', e.g., the empty register x is swapped for the full register y. But while we swap this information in the ENTL protocol, in the ENTT protocol, we take it. So rather than the binary contents of one register being overwritten by the binary contents of another, the contents of one register is taken, and is added to another. This leaves the original register empty (Ø). This is what stalls the link in each of the 4 phases of the ENTT transfer and guarantees atomicity.

Two classical bits can represent a single qubit, but four classical bits can represent two entangled qubits. There are pros and cons and questions for each representation. One issue is symmetry breaking. ENTL can express a TICK/TICK, protocol, or a TICK/TOCK, protocol; depending on whether we are looking at each side with a Local Observer View (from within each end of the link), or a God's-Eye-View, for the link as a whole. In practice, in an Ethernet implementation, 64-bytes is available as a minimum packet size. This provides lots of additional redundancy to detect torn or corrupted packets, and to add sufficient redundancy for Alice or Bob to detect invalid states.

ENTL Protocol

The 'EARTH Non Time Liveness' (ENTL) protocol, provides a mechanism to emulate entanglement. It does so by maintaining a constant (perpetual) exchange of a packet on a self-synchronous link, where external agents are unable to observe this perpetual exchange.

This property is achieved by:
Alice prepares her two buckets for her ESI, with each bucket capable of representing 4 states: +1, 0, −1, and Ø

This requires ≥2 conventional binary bits; because a single bit can express only two states. However, it does not mean that each bit necessarily represents independent functions. For example, the 'combination' of 2-bits can represent 00, 01, 10 and 11, which may be interpreted as: 0, +1, −1 and Ø, respectively, 0 represents "not tangled", +1 and −1 represent tangled (with complementary state on the opposite side of the link). Ø represents empty.

Alice sends ENTL [0, Ø] (hello) continually on the link until she receives an acceptance or counter-proposal. This (necessarily) contains only what she knows herself: e.g., a 2-bit vector for her half of the ESI.

An embodiment may also contain other information provided by convention in the protocol for higher-level system functions, such as static information describing the capabilities of the node (identity resources, supported protocol versions, etc.), or dynamic information useful in the operational state of the system (link utilization, cell utilization, average queuing time, etc.).

Bob responds to Alice's proposal by swapping the two buckets and appending his own half of the ESI in the first bucket. This pair of combined buckets now forms a 2×2 matrix of Alice's and Bob's 2-bit vectors in a single ESI. The goal in the embodiment as well as mathematically is to achieve the minimum feasible mechanism, i.e., the number of required bits on the wire, and mechanisms to receive, transform and return the ESI.

Alice and Bob now exchange (send back and forth) this ESI, perpetually updating each other on their best knowledge of this shared state.

Alice combines her full awareness of the ESI (both halves), and sends that back and forth with Bob.

ENTL Protocol

A section of a network packet (in the protocol training, signaling preamble, header or body), contains two 'buckets.' The first bucket containing information about what this side (Alice) knows about herself, and the second bucket containing information about what she knows about the other side (Bob).

When Alice sends the first packet, she doesn't know anything about Bob, and uses a symbol (some arrangement of the bits of information) to specify that her version of Bob's bucket is empty.

Each of the buckets contains a minimum discernible symbol that indicates an empty state.

Any number of buckets may be used, but the minimum is two (one representing Alice's information, and one representing Bob's information). They may, however, be treated as a single larger bucket of symbols.

A symbol represents a 2-bit bucket so that we can distinguish a minimum of 4 states.

The symbol may be digitally encoded by the various means used in today's Interconnects, such as Ethernet, PCIe, Infiniband and GenZ on a copper wire, or fiber.

A circulating ENTL packet representing an "Element of Shared Information" (ESI) establishes and maintains mutual state coupling (presence) in a bipartite link (interfaces plus media) between two nodes (computers or switches).

A single self-regenerating ESI which, when a reception event occurs on one side of the link, immediately generates a transformation, followed by a transmission of the updated ESI to the other side of the link. When this process occurs on both sides of the link, the packets circulate in perpetuity until a higher-level operation is requested from one side or the other or the link.

A single "indivisible" ESI, with sufficient redundancy remains recognizable even in environments where packet corruption can occur, such as bit flips, burst errors or torn packets. For example, the packet type (and content) may be repeated multiple times throughout the packet until it is full, and an extended erasure code used to detect burst errors.

A single "indivisible" ESI that carries sufficient bits to mutually recognize two states (from the perspective of either end of the link) represents a continuously repeating two state presence management (e.g., TICK-TOCK) token.

Two or multiple ESI's are independently recognizable, either through encoding of each element in a linear sending order of bits, or in a spatial distribution of bits across multiple parallel channels. For example, the four twisted pairs of Ethernet, or the multiple channels of other interface technologies such as PCIe.

Separate and independent ESI's are associated with the initiator. In a bipartite link there may be exactly two initiators, and thus a minimum of two independent recirculating ESI's.

A mechanism detects when the element of information has failed (stopped recirculating). In one embodiment, a modulo encounter which uses one of the independently recognizable ESI's to verify the successive evolution of any other of the independently recognizable ESI's within the link. N may be chosen as the minimum number to enable the recognition of failures in liveness (successiveness) in the initiator, temporal or spatial separation of the ESI's.

A mechanism kickstarts the ENTL process (ESI's in the link circulating in perpetuity).

In one embodiment, each side injects its own ENTL token and keeps track of it. There may therefore be two distinguishable tokens circulating concurrently in the link.

Each side may signal its status (initiating, entangled, shutting down, etc.) by decorating its ENTL token with additional status information.

Each side may also signal its readiness to receive another packet by decorating its ENTL token with additional status information (similar to a conventional pause).

Each side may also signal its error status in case a stall is required, for example, to enable its applications to recover from an internal error.

Each side may also signal its capacity/loading status, for example, for load balancers to have minimum possible latency, e.g., to respond to a need to redirect traffic to more lightly loaded cells, when a fabric is approaching its maximum load ENTL is the "liveness" protocol. ENTT is the "Transaction" Protocol, which transfers the AIT Token from one side of the link to the other. When used together, they maintain coherence, which in turn guarantees the CQ/EQ property.

The ENTL protocol is a basic resource to maintain what is called 'liveness' in the computer science literature, but which we call "mutual state coupling" here because of its ability to atomically transition to a 4-phase protocol and maintain coherence while AIT tokens are transferred with local reversibility property.

The terminology we have used in the past has been ENTL tokens (which are timeless) and ENTT tokens (AIT). However there is a fundamental CQ/EQ relationship between the ESI representing the timeless ENTL 2-phase protocol, and the transactional ENTT 4-phase protocol, i.e. the ENTL ESI is an event, which, depending on a local trigger, will continue that event into an ENTT ESI, to transfer the AIT token (along with any logical bits associated with it), and then the final ESI event of the ENTT protocol is carried back into an ENTL ESI to complete the transfer, and terminate (flush) the last transaction.

The protocols require:
1. A mechanism such as a register, to check for a request from the Cell Agent to send an AIT packet. If the register is empty, it returns the ESI as normal in the next ENTL packet sent. If the register is not empty, it pulls the information about the AIT token from the register (thereby leaving the register now empty), and proceeds with the 4-phase protocol to transfer the AIT token across the link indivisibly.
2. A mechanism to verify the acceptance of the AIT token at the destination(s), and replace the ENTT packet with an ENTL packet, which terminates the transfer, and returns to the timeless state of recirculating ESI's in the link.
3. A mechanism to compose the ENTL mechanism over multiple links (Chains, Trees and Rings), by decorating the normal bipartite link ENTL packets with information from the endpoints. Note that the endpoints in a Tree entanglement are the root, and the leaves.
4. A mechanism to compose the ENTT mechanism over multiple links (Chains, Trees and Rings) by extending the AIT packet to multiple (counted but not individually identified) destinations by equipping the AIT token with a mechanism to split on the way from the root to the leaves, and to join on the way from the leaves to the root.

From one level (GEV) the two sides are indistinguishable, and there is no 'visible digraph'. From another level (LOV) each side can see separate transmit and receive channels, which each have their own specific arrow; this is what we call 'orientation'. From that perspective, each side thinks it is Alice, and the other side is Bob.

Although in a physical link we automatically have the 'orientation', in a shared memory implementation, there will be two processes, which must arbitrate somehow to create that orientation when looking at the data structure.

The conventional notion of measurement is to read (i.e., extract/pull) information from a system. However, trying to read the TICK/TOCK state of the link will yield no actual information: a random 0 (TICK) or 1 (TOCK) will be equally probable to an outside (unsynchronized) observer. This is similar to the Nyquist theorem, where the link protocol exchange is running at a far higher rate of change than the read process can access the data, so the state of an unsolicited read is completely non-deterministic. We refer to this as a 'pull' protocol.

The alternative is a 'push'. For an event to emerge at Alice, Bob has to add new information (in the form of an AIT token) on his side of the link. This will cause the link on Alice's side to receive an event that is recognized within the blue link area shown in FIG. 4 as an AIT token, and therefore be pushed (transferred) to the Cell Agent's Buffer. A push from register y to z, leaves y empty (Ø) and the link stalled until the ack is pushed from register w to register x, now leaving register w empty (Ø).

Implementation: Processing

The preferred embodiment is to use non-blocking (i.e., Lock-free operations) in the implementations. Locking or any form of stalling will decrease the effectiveness of mutual state coupling (coherence).

There are really only 3 states for the local representation of the ESI. The 4th state is empty Ø, i.e., ESI not present. Encoding Ø=11 is merely a possible embodiment.

00 There is no Element of Shared Information (ESI) in the link.
01 ESI, I have +1
10 ESI, I have −1
11 I don't have the ESI, it's in-flight in the link.

The ESI (bits on the wire) does not increment to get the next state. It does not flip the bits to get the next state; if swaps' the bits within the bucket. Swapping the bits 00 and 11 results in a new state which is indistinguishable from the previous state. Only when the bits are 01 and 10 will the swap work, and TICK will be followed by TOCK, and TOCK will be followed by TICK.

Alternate Embodiments

[Single ENTL ESI—constant] Always set to 1, provides only TOCK-TOCK (for a sender) and TICK-TICK for a receiver. This may not be useful without an Rx transform, or Tx Transform. No visible change in the register for Alice or Bob. However, this option is a possible embodiment, because, in, for example, the Ethernet implementations, we will still get the event representing the arrival of information, even if the contents of the packet are the same going in and coming out.

[Single ENTL ESI—1 bit] We have only one bit, which alternates between 0 and 1. TICK-TOCK. This implies a change (either Tx or Rx Transform is active, but not both, on each side). Alice receives TICK (0) into a register (or memory), and does a Tx Transform (TxT) to (1), which goes out on the wire as a TOCK. Bob receives the TOCK (1), and reads this into his register (or memory) and does a TxT to 0, which goes out on the wire as a TICK, and the cycle completes. Symmetry is broken because Alice always sends TICKs and Bob always sends TOCKs, but neither sees any change, e.g., if Alice receives a 1, she will always receive a 1.

[Single ENTL ESI, Asymmetric Transform] This model is the same as above, except the initiator (e.g., Alice) can break the symmetry by choosing which transform to use for her side (Tx or Rx), and trigger the other side (Bob) to use the opposite, i.e., if Alice uses TxT, then Bob should use RxT. If Alice chooses RxT, then Bob uses TxT. This makes no difference on the wire, but it will complement the ESI state in the registers on each side, thus allowing us to provide the TICK TOCK visibility in the memory on each side, and the corresponding visibility of randomness in a read of the link

[Single ENTL ESI, 2 bits] We can now explore the state space of a 2 bit vector in the register, and on the wire, for all the permutations of Alice and Bob. There are many ways to do this. The essence is that Alice can synchronize with (observe and swap) Bob's local state through the ENTL protocol, and Bob in turn can synchronize with (observe and swap) Alice's local state, but there can be no observation of this state by entitles outside the Half-Link without disturbing the state of entanglement (i.e., stalling the protocol).

Stalling the protocol may not destroy coherence if we keep both sides of the link suspended until the events (due to transform processing) are complete and a response is generated. The protocol allows the replacement of the ENTL protocol with the ENTT protocol, the degenerate case of which stalls the ENTT protocol while the packet is being processed. In one embodiment, a Sub-Virtualization Layer (SVL) processes it. This assumes the SVL is reliable, lock-free, and the threads are pinned to a core. We also try to avoid any possibility of cache misses which would introduce nondeterminism.

An alternate embodiment replaces the ENTL token with a 'liveness maintaining' or 'stuttering' ENTT protocol—i.e., one that keeps the link alive, but allows some flexibility in how the AIT token is processed in the SVL.

An example would be for this protocol to allow Alice and Bob to alternately exchange their state. With one bit, we have the situation where one side has +1 and the other side has −1, on the next transition we have the opposite. But one bit cannot encode the two other states: That both Alice and Bob do not have the ESI: it is "on the wire"; either on its way to Bob or on its way to Alice. This gives us 4 possible states, which can be encoded in one bucket (2 which corresponds with what we care about: the emulation of 2 qubits, which may become entangled.

[Single ENTT ESI] This token can be used to provide transport (indivisible transfer) of AIT Tokens. This is described in more detail in the next section. ENTT switches coherently from the 2-phase protocol to the 4-state protocol, transfers the AIT token, allowing for failures to accept the token in the destination, and return it to the sender. i.e., reversibility when localized failures occur.

[Dual ESI] Each side (Alice, Bob) initiate and maintain distinguishable ENTL and ENTT tokens. AIT tokens are distinguished either by symmetry breaking, or some higher level of unique identifier.

[Multiple ESI] Each side (Alice, Bob) can pipeline multiple AIT tokens. Each token must be unique, so that recovery can occur independently on each token.

[Multiple ESI on a Chain] A chain of cells: Alice, Bob, Charlie, Dave, Edward, Fred, etc., may have their own AIT tokens present on any one link. i.e., each link may support multiple concurrent AIT tokens, and the modulus of the counter will be set equal to the number of links in the chain.

Implementing the concept of information being a surprise, or equivalently, a notion of time/evolution as change that we can count, the protocol may use a transform (e.g., a swap, a matrix operator or both) on the ESI state, contained in the incoming packet, as it comes in (Rx/received), as it goes out (Tx/sent), or both. Both sides of the link must execute the same (or a complementary) protocol to maintain symmetry. There are four possibilities, indicated by a protocol type (PROT=X, Y, where X=TxR, and Y=TxT):
1. PROT=$\overline{\text{TxR}}$, $\overline{\text{TxT}}$ Do not transform on Rx. Do not transform on Tx.
2. PROT=$\overline{\text{TxR}}$, TxT Do not transform on Rx. Transform on Tx.
3. PROT=TxR, $\overline{\text{TxT}}$ Transform on Rx. Do not transform on Tx.
4. PROT=TxR, TxT Transfer on Rx. Transform on Tx.

The link is equipped with a mechanism to specify and enable these transforms. If the Rx transform is empty (an identity operator), then no transform is performed. Equivalently, for the Tx Transform. If the Rx transform is non-empty, then the transform will be carried out as specified in the equipment associated with the Half-Link. Equivalently for the Tx Transform, as shown in FIGS. 2 and 3. Transforms are typically implemented as a lookup table in the Half-Link.

Signal Encoding. The original ENTL and ENTT documentation (2008/9), and patent provisionals (2013) describe many alternative embodiments for the signal encoding on the wire. These include encoding the ENTL bits in the header of regular Ethernet packet, the start frame, the disparity codes, or raw information encoded by any signaling means as close as possible to the wire. The ultimate encoding single photon transmitter and receiver pairs on the link. Also included were the encodings on 4 separate twisted pairs in recent (>10 Gb) Ethernet standards.

We here include Pulse Amplitude Modulation (PAM-L) where L specifies the number of levels in a Pulse Amplitude Modulation scheme, which replaces previous Non-Return to Zero (NRZ modulation schemes). Although any PAM-L modulation scheme can be used, PAM-16 encoding provides four bits per signal unit, which corresponds to our two pairs of 'buckets', and the encoding transformations described in the table in FIG. 13.

While there may be product/business reasons to focus on Ethernet as the deployment vehicle, there is no technical reason why this cannot be implemented on some future version of Infiniband, Omnipath, NVLink, or other favorite interconnect. In particular, the current Remote Direct Memory Access (RDMA) evangelized by Infiniband and now available on Ethernet as RoCE, can be significantly enhanced through their extension with ENTL and ENTT protocols described here.

The underlying mechanism is simple, and therefore straightforward to map the state space for a 2, 4, or higher number of pairs of bits in the link. The key is that the information is shared, it is not a separate 'bits' of information on each side. This is achieved by a protocol which constantly, and atomically, exchanges a portion of the state on one side, with a portion of the state on the other side. AIT is like a compare and swap (CAS) operation, but on the link (reversible message system) instead of in shared memory.

The ENTT (Transaction) protocol normally requires a total of four states. However, two of them can be harvested from the preceding TICK-TOCK states. Providing entanglement is active, the link is therefore perpetually prepared for a transaction and continues the self-regenerating events in the ENTL protocol, now with four states of a "clock" instead of two: (TICK TOCK TECK TACK), so we can distinguish forward and reverse computation on the link. ENTT atomically transfers AIT (Atomic Information Transfer) tokens over the link. The transfer takes place in the TECK phase of the protocol, is acknowledged TACK, and terminated by returning (for at least one cycle) to the ENTL protocol. This can be extended into different protocol state spaces, e.g., modulo-(2, 4, 6, 8, 12, 24), etc., to provide a rich extension for additional protocols, for multiple (pipelined) AIT tokens on a chain.

Combinations of Base Protocol and Higher-Level Protocols

This section contains descriptions of using the ENTL and ENTT protocols to implement higher level protocols.

Combining ENTL and Flow Control

The conserved quantities (CQ/EQ) mechanisms are able to subsume additional functionality, such as a credit-based flow control. The basic ENTL protocol is described above for a single link, but it can easily be extended to a chain or a tree.

ENTL packets can carry additional information, such as the amount of buffer space available. In this context, we say that the ENTL packet is "equipped" with a mechanism (state machine and fields within the packets) to provide an infrastructure capability, such as credit-based flow control, or some other function intrinsic to the mechanisms.

We use the words equipped and decorated to distinguish the legacy OS, Containers and applications above the VM call interface, and the mechanism(s) intrinsic to our interface.

Combining ENTL and Load Balancing

ENTL packets can carry even higher-level information, such as the amount of processing needed by the applications. In this context, we say that the ENTL packet is decorated with a mechanism (state machine and fields within the packets) to provide an application capability, such as load balancing.

Link Applications

A link is an individual, bidirectional, computation object (an autonomous communication entity between two cells). Think of a link as a compute element with its own autonomous and independent failure domain consisting of the cable and NICs on both ends which form their own self-contained execution environment. In the same way devices within a single execution environment are considered a single failure domain; the link can detect device and cable errors and stop the machine.

A consequence of unifying compute and switch node elements is that it makes things simpler because we have only one type of node to manage instead of two. The consequence of making a link a first-class object with state and behavior is profoundly more interesting: we raise the notion of a link to first order—a first-class citizen in the infrastructure—a bipartite—as 'having two parts, or an agreement between two parties.' Links carry elements of information with two complementary halves—persistable through failure and recovery events, i.e., a communication object that doesn't rule out that some fault-detection and computation is involved.

An example is a property that guarantees nodes on both sides of a link know when the link breaks without sending a message between them. This solution to the common knowledge problem allows us to address many challenging problems in distributed systems.

These common knowledge and AIT properties are composable. In one embodiment, the nodes are configured to communicate on trees. In this embodiment, trees of links provide a resilient conserved quantities mechanism to reliably distribute tokens among agents on an application graph. Intermediate cells promise to never lose AIT tokens. This defends against lost tokens because if any part of the chain (or tree) breaks, alternate paths are available to seamlessly recover the conserved quantity and continue operation.

The alternative definition of Futures/Promises also applies: execution entities primed to create future events for liveness.

By strengthening the system model, links and AIT provide a general foundation to solve many distributed systems problems[1], such as failure-detection, consensus and distributed transactions.

[1] Links also provide a more reliable foundation for distributed system services for applications: consensus, atomic broadcast, leader election, and distributed arithmetic, which in-turn enable higher level functions such as network-assisted-transactions which serve, for example, distributable (scale-out), persistable (durable), and lightweight (but-accurate) accounting of conserved quantities associated with application state or resource usage.

The shared state property is strengthened by mechanisms to recover from each type of failure. The more types of failures, the more complex and intractable this becomes. Links are independent failure domains, with (effectively) one failure hazard, disconnection[2]; which is straightforward to recover from. Switched networks, on the other hand, have many more failure hazards: they indiscriminately drop, delay, duplicate and reorder packets—that's just the way networks behave—justified by the end-to-end argument[3].

[2] In any physical system it is possible to drop packets, it will be much rarer but it is still possible links can recover from individually dropped or corrupted packets, and shared state integrity can be maintained.

[3] The end-to-end principle states that in a general-purpose network, application-specific functions ought to reside in the end hosts of a network rather than in intermediary nodes, provided that they can be implemented "completely and correctly" in the end host. Our chain is that it is impossible to implement bidirectional synchronization primitives "completely and correctly" without AIT (or something very much like it). The datacenter is not the Internet, and Saltzer, Reed & Clark considered only a careful (unidirectional) file transfer, not the bidirectional synchronization of replicas (coherency).

Shared state, which replaces conventional notions of heartbeats and time-outs, can be used to mitigate broadcast storms in network rendezvous, timeout storms in microservices, or reconstruction storms in erasure coded storage[4]. In AIT, packets are not merely dropped, they are replaced with special events denoting failure to maintain liveness. Because link failures are independent, we can successively recover individual disconnection failures. This paves the way for AIT to reverse one or more steps in distributed systems which use non-idempotent or non-commutative data structures.

[4] Links also coalesce heartbeats to make microservices more scalable, and make failure detectors reliable.

Disconnection is the most likely failure hazard in links. Packets delayed by disconnected links don't threaten liveness or the integrity of the shared state. Switched network hazards include: indiscriminately dropped, delayed, duplicated and reordered packets. Conventional mitigations (e.g., TCP) add significant complexity and performance overheads, and still fail to solve the problem.

Examples

The advantage of the shared state is that both sides know the link is broken[5], which, can't be done through a switched network with even a single switch in series. Links simplify some important distributed system algorithms such as two-phase commit, consensus and reliable tree generation:

[5] The shared state can be compromised by duplicated or reordered packets, but it is resilient to lost or delayed packets.

[Two-phase commit] The prepare phase is asking if the receiving agent is ready to accept the token. This serves two purposes: communication liveness and agent readiness, Links[6] provide the communication liveness test, and we can avoid blocking on agent ready, by having the link store the token on the receiving half of the link. If there is a failure, both, sides know; and both sides know what to do next.

[6] Links exploit a unique combination of physics, electrical engineering and computer science. Think of AIT as the distributed systems (message passing based) equivalent of the atomic Compare And Swap (CAS) primitive used in shared memory architectures. The result is handshake-free messaging with strong liveness, recoverability and security properties.

[Paxos] "Agents may fail by stopping, and may restart. Since all agents may fail after a value is chosen and then restart, a solution is impossible unless some information can be remembered by an agent that has failed and restarted". The assumption is when a node has failed and restarted, it can't remember the state it needs to recover. With AIT, the other half of the link can tell it the state to recover from.

[Reliable tree generation] Binary link reversal algorithms[7] work by reversing the directions of some edges, transforming an arbitrary directed acyclic input, graph into an output graph with at least one mute from each node to a special destination node. The resulting graph can thus be used to route messages in a loop-free manner[8]. Links store the direction of the arrow (head and tail); AIT facilitates the atomic swap of the arrow's tail and head to maintain loop-free routes during failure and recovery.

[7] Charron-Bost et. al. generalizes the Gafui-Bertsakas (GB) binary link reversal algorithm.

[8] Link reversal algorithms don't generate shortest paths, just some paths. However, they do generate multiple loop-free routes. This allows the link to inform the agent (and the application, if needed) when switching to an alternate failover tree. As long as precomputed failover paths are available, we used the Dynamic Tree Algorithm (DTA), Only when cells lose all their paths do they need to participate in the link-reversal algorithms, which means less communication overhead and more stability.

Links require a single physical connection; their benefits cannot be achieved over switched networks composed of a chain of unreliable links.

The shared state integrity of the single physical link is a promise that two NIC's can make with each other only over a dedicated physical link. This is explicitly an anti-promise for conventional switched networks.

Combining the shared state and AIT properties with classical algorithms provides a general foundation to solve many distributed systems problems, as well as to mitigate broadcast, timeout and reconstruction storms in modern datacenters. Link properties can be composed over arbitrary graphs of connections in datacenters of all varieties and scale.

In-Memory Embodiments

This section describes the operation and one of several possible embodiments (or simulation) of the mutual state coupling (MSC) property on the link (two computers, one on either side). However, these operations can also be simulated in memory, so that large scale simulations (on a single machine, or a distributed set of machines) can faithfully follow the model. In-memory entanglement is made possible by having two separate processes (or two separate processor cores) access a data structure in shared memory in a very similar way to that shown above with the input transforms, output transforms, and state space exploration.

Memory-Based ESI Relationships

In-memory entanglement can be emulated between two processes. Consumer-producer and producer-consumer (or a more symmetric implication-conducer-conducer-a combination of the words consumer-producer), requires conserved quantities in their messaging too. However, this is much easier to achieve in memory because we can use conventional CAS instructions for atomicity in shared memory.

The simple 2×2 matrix, which governs the liveness and transactionality of the link protocol, can now be used as a data structure in memory for communication between processes; it's use cases include:

Simulating medium scale, no-time network fabric on a single machine.

Simulating large scale, no-time network fabric on a cluster of machines.

Simulating scale-independent no-time network fabrics on a set of machines which are themselves a physical set of resources on network fabric.

Communicating atomically, reversibly and securely from the no-time link to higher layers in the implementation stack, such as a data layer or a sub-virutalization (SVL) layer.

Communicating atomically to conventional OSs, Drivers and Protocol stacks in the VM's.

Communicating atomically through interface libraries to containers in the application layers.

In some respects, the idea of atomic operations has been exhaustively researched in the literature of blocking and non-blocking algorithms, processor instruction sets, and various forms of lock-free data structures. What is new is the mechanism for extensible link reversibility in our link protocols to be 'matched' with equivalent primitives which emulate these links inside a shared memory system. A key benefit is the distillation of all operations to be either cell-like, or link-like, and recognizing the role of link reversibility (in the physical links, and simulated links in memory) as basic building blocks which can be reasoned about mathematically, through Graph theory, and Category theory.

Figure 16:
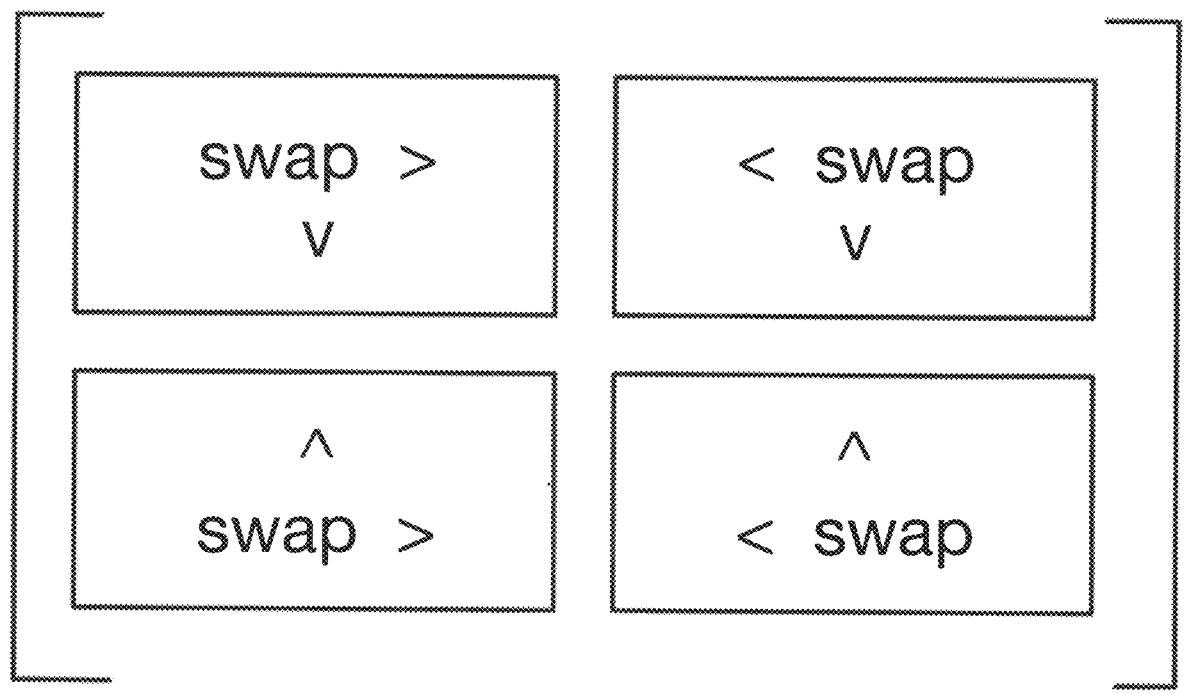
FIG. 16 shows the four elements of the ESI (two buckets) and an example of the set of swap operations that may be carried out.
Figure 17:
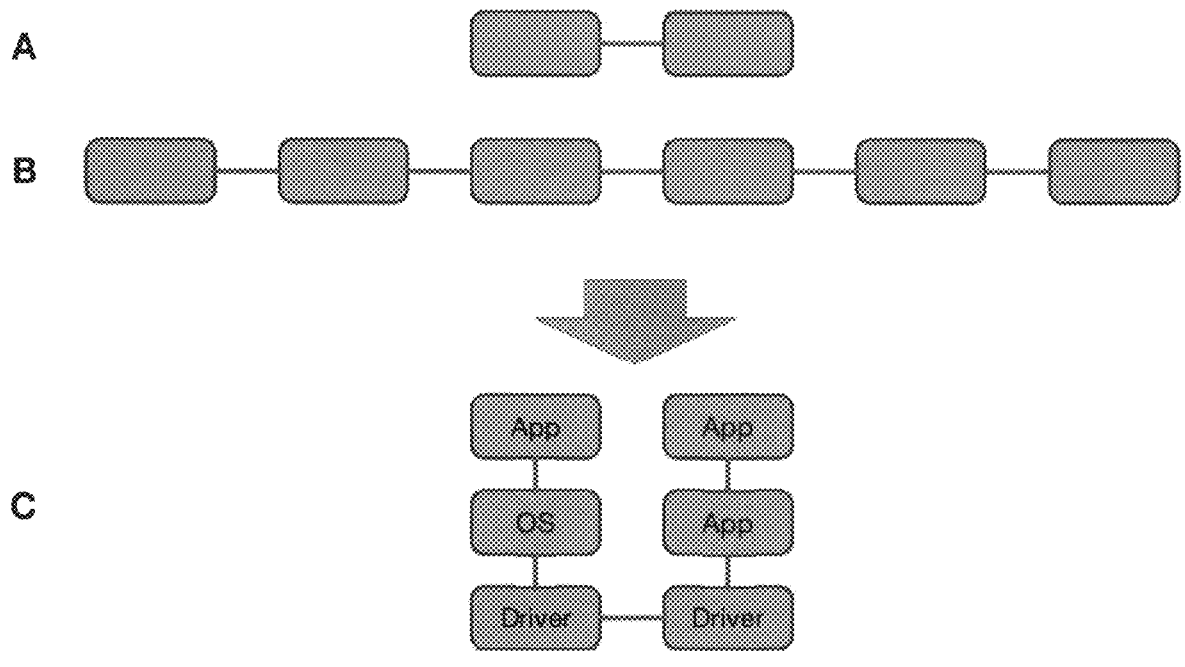
FIG. 17 shows (A) Two cells and one link, (B) a drain of cells and links, and (C) In-Memory Equivalents (to ENTT) or 'logical cells' which each have ESI relationships to each other. E.g., the device driver may have an 'in-memory' relationship with the OS, the OS may have an 'in-memory' relationship with the application. Memory-equivalent operations are synthesized using any appropriate combination of instructions (including Compare and Swap (CAS)), to guarantee an effective transform, and atomic behavior, when an AIT token is injected into the data structure.
Figure 18:
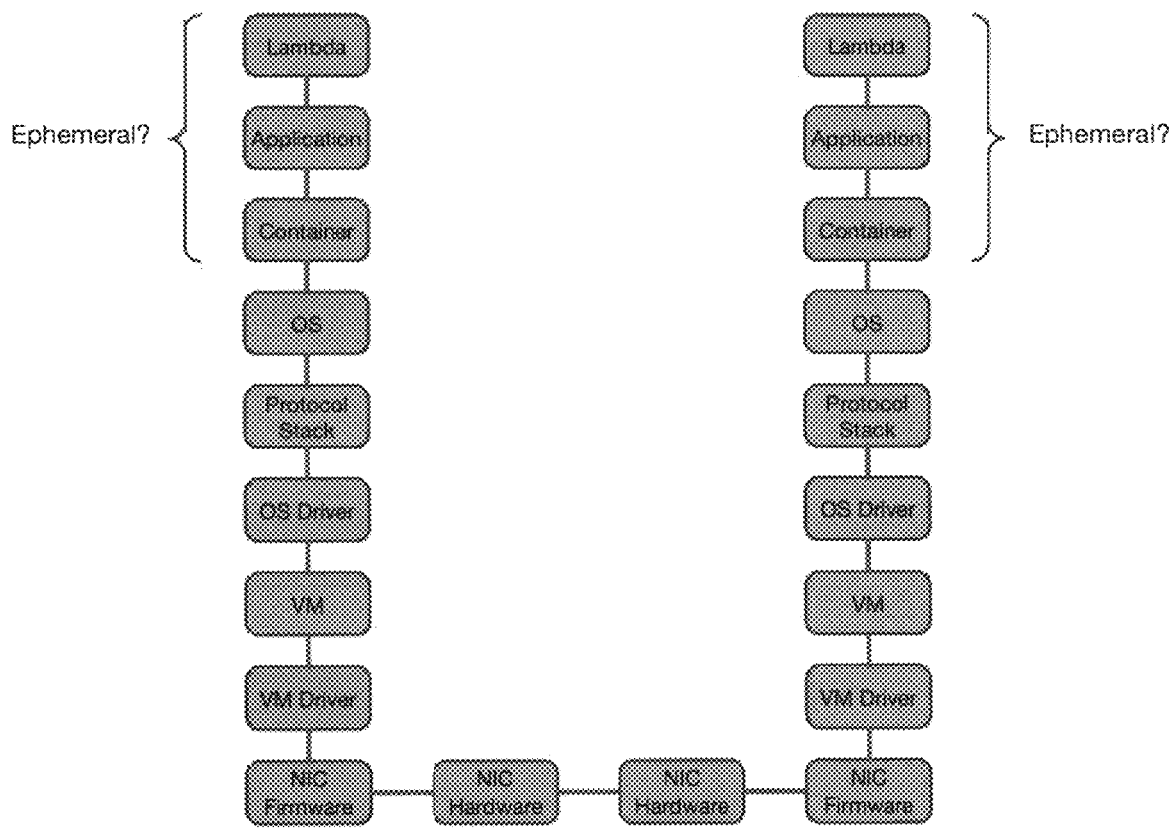
FIG. 18 shows the generalization of the in-memory equivalent operations to an arbitrary length chain up some stack and the composition of exactly-once semantics all the way up to a function within the application.
Figure 19:
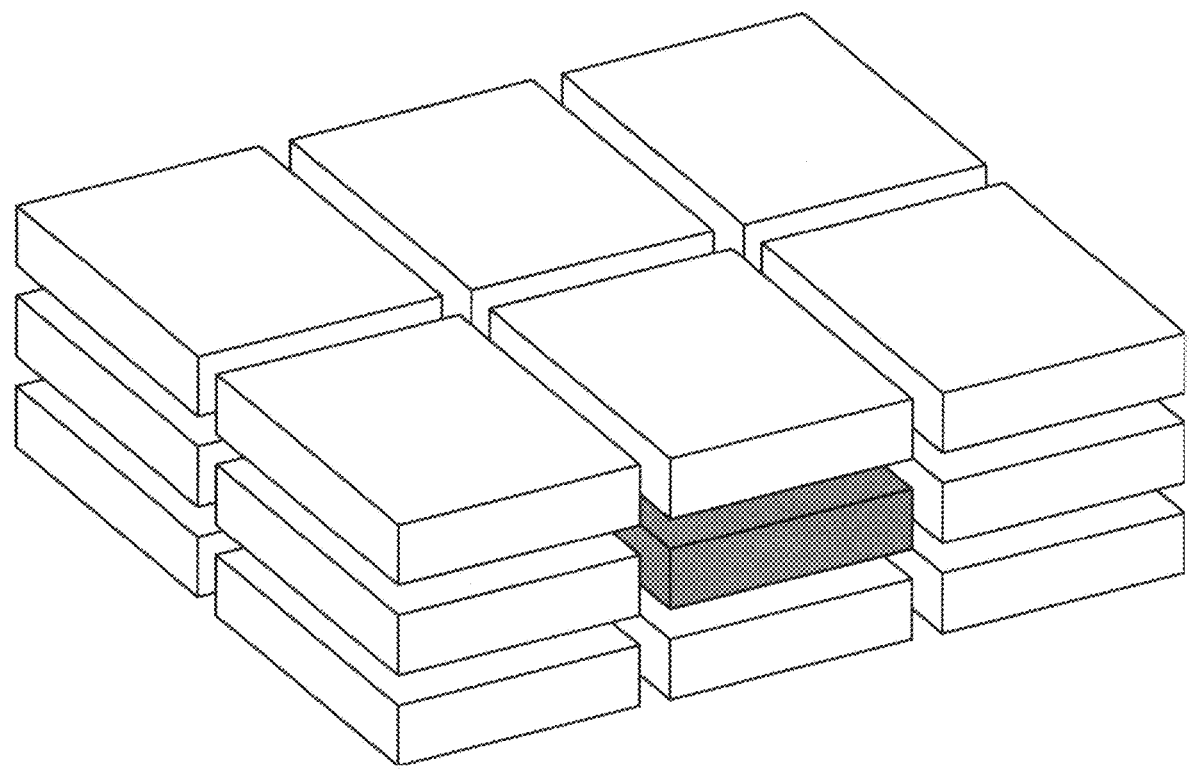
FIG. 19 shows physical cell packing in 2 and 3 dimensions in a data center. This illustrates the neighbor relationships for links can effectively use a valency of 8 (9 cells including the self-cell), in 2 dimensions; and a valency of 17 (18 cells) in two back-to-back configurations.

FIG. 16 shows the basic 2×2 matrix manipulation which is employed in the link. When this is implemented in memory, it is important to realize that while the starting conditions may contain symbols (bits) that are initiated by one side or the other (Alice or Bob), after one or more iterations of the transform around the loop, who made (some of) the last transforms, will no longer be distinguishable. As shown in FIG. 16 the four elements can be arbitrarily swapped or transposed (column, row, reflecting across diagonal), with natural numbers (integers), or with symbols which reflect or $-1$, 0, $-1$ or the imaginary number $\sqrt{-1}$.

An in-memory data structure may thus be created to execute these transforms (or any other transform that is either mathematically related, or even just an arbitrary lookup in a table). Two processes may then communicate from their respective vantage points (as Alice, or Bob, but not both). Plus, a third party may advance the TICK-TOCK state of the data structure, emulating the random behavior of the 'ENTL' link in real memory. This same, or another third-party process may also be used to inject faults into the system.

In a simulation of ENTL and ENTT entirely contained in a single shared memory machine, we do not need to 'poll' memory locations, simple event structures will suffice. We want to map out, with an in-memory simulation only (not on a link just yet) all the possible states of a 4-element quantity. These 4 elements are initially bits (e.g., 4 bits), but later we can make them arbitrary integers up to 64 bits. Two processes are reading and writing the same memory. In an alternate embodiment, they poll and sleep (to prevent locking up the simulation machine).

In principle, these are 4 bits representing a 2×2 matrix (symbols $-1$, 0, $-1$ and $\emptyset$). 2 bits represent what one side (Alice) knows about herself, the other 2 represent what Alice side knows about the other side (Bob).

When they wake, they test to see if something new has arrived, and use a code that generates a compare and exchange operation. If the contents of the memory and the register are the same, go back to sleep. If they are different, then invoke one or two possible transforms using roles from lookup tables.

Figure 13:
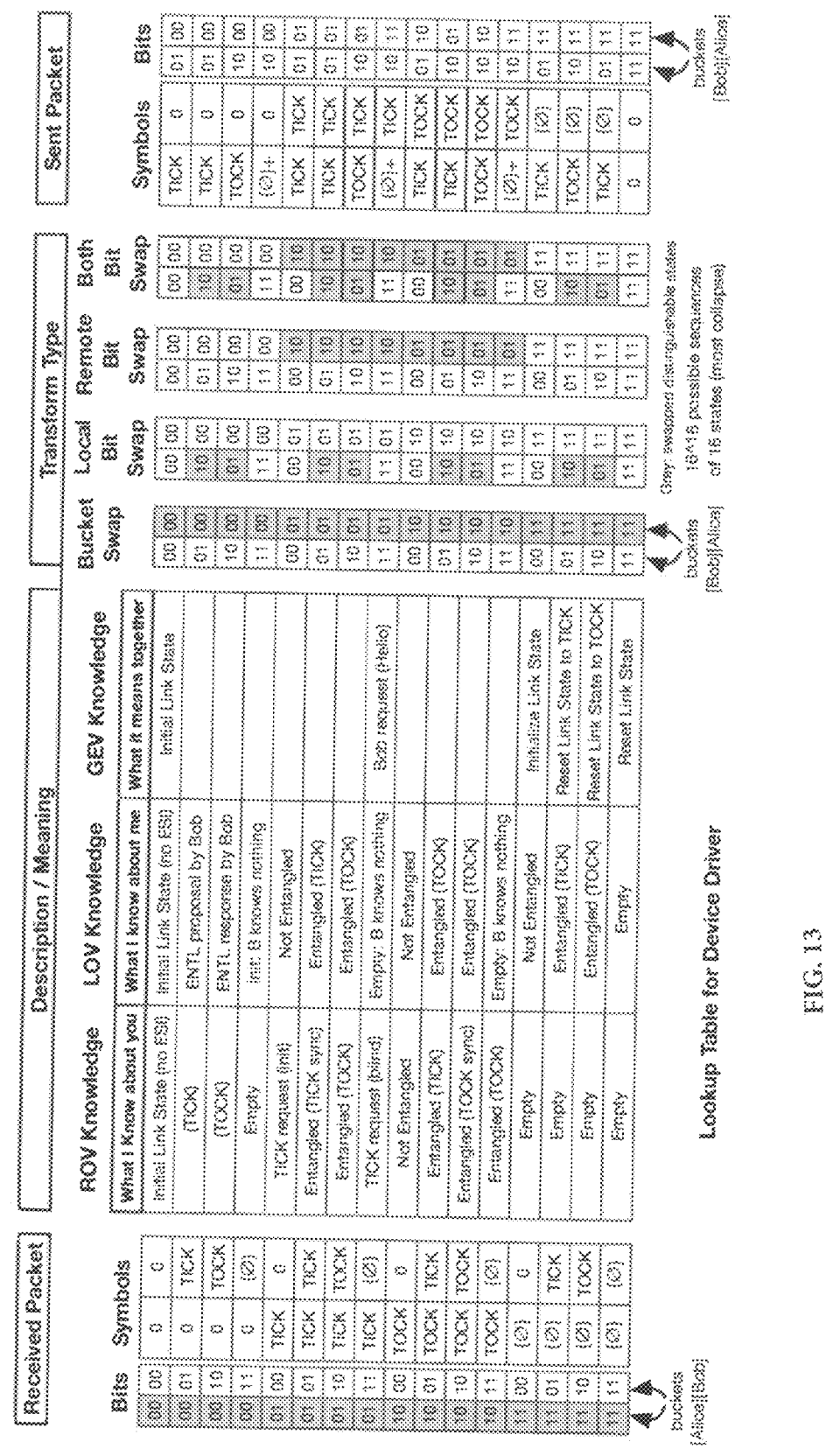

Alice Input Transform
Alice Output Transform
Bob Input Transform
Bob Output Transform They should start from an input condition of 0001. (or 0100) depending on the perspective of Bob or Alice. FIG. 13 shows a table describing the various transforms we would like to test. LOV means Local Observer View Knowledge, ROV means Remote Observer View Knowledge, and GEV means "simultaneous" both sides knowledge.

Command line invocation with 5 parameters can start the simulation:
1. Initialization (kickstart the Entanglement Engine).
2. Alice Input Transform.
3. Alice Output Transform.
4. Bob Input Transform.
5. Bob output Transform.

If any of the parameters are omitted from the command line, assume they are zero. If the initialization parameter is omitted from the command line, assume it is 0001. The output can go to the stdout. This capability allows us to exhaustively explore all the combinations, notice which ones die quickly (output never changes after the first swap), and which ones appear to oscillate (in steps of 2, some in steps of 4). These are the liveness conditions, and should correspond to the TICK TOCK states in the table above. Think of this as a One-dimensional Cellular Automata, which either oscillates or dies depending on what rules you give it.

Bipartite Locking

ENTL and ENTT with AIT are a communication channel protocol. If we are emulating their properties in memory for the purposes of simulation of a larger distributed system, or for the purpose of exploiting their properties in microkernels or other subvirtualization components (for example in the EARTH Network Asset Layer (NAL), Data Asset Layer (DAL) or Computation Asset Layer (CAL), then the following Embodiment is offered:

Alice and Bob are running on separate cores. They communicate through a data structure we call a 'virtual link'.

Adjacent memory locations representing the registers on both sides of a link described above would enable a bipartite lock. This is an ENTL token, which is in one memory location, or the other, but not both.

Whereas the real ENTL and ENTT link protocols must constantly circulate packets to maintain mutual state coupling, we can assume mutual state coupling is maintained via the synchronization domain of the memory bus and DRAM or NVDIMM devices. So constant 'pulling' is not required by the virtual ENTL and ENTT protocols.

Instead, two processes (Alice, and Bob) are able to communicate with each other with the AIT protocol via the memory locations. If Alice wishes to push an AIT Token to Bob, she must first check that she already has the ENTL token. If she has, then the AIT protocol is initiated. If she does not, then she must request the ENTL token, and when she gets it, proceed with the AIT protocol.

Because Alice and Bob are both subject to the arbitration in the memory bus/cache hierarchy, Alice can take it upon herself to "swap" the memory locations A and B, such that B is now in A's location, and A is now in B's location. This is equivalent to the real communication link acting independently and constantly exchanging packets. Except, in this case, we only exchange packets when we have to. If we don't have to, we can just go ahead and proceed into the virtual ENTT protocol.

The Virtual Link is implemented in adjacent memory locations, each with either (a) the full/empty bits, or (b) the bucket system described above. In effect, it is a type of lock that instead of atomically swapping a register with memory, it swaps two memory locations, arbitrated by the conventional bus and memory hardware. We call this a Bipartite, or ping-pong lock.

The rest of the protocol as described above, along with similar encodings, can be used to implement this in practice. The general embodiment claims all forms of swapping in the 2×2 matrix described in FIG. 16

In this way, the atomic transfer, and the no-cloning properties of the protocol can be applied to higher level structures, such as software components that wish to communicate with one another reliably, but where one side might crash. In a similar way to the real link protocols, the Bipartite Lock data structures are available to aid with recovery.

The key new area of understanding, is that the requirements for atomic interchange (EQ/CQ) exist at every level in the system.

What is claimed is:

1. A method of chain entanglement for circulating a packet of information, comprising:
    a set of cells, the set of cells comprises a set of computers, wherein each cell from the set of cells is connected to its neighboring cells through a plurality of links forming an entangled tree, wherein the set of cells comprises
    a root cell, the root cell communicates with its neighboring cells through an Earth No-Time Liveness (ENTL) protocol, the ENTL protocol is equipped with information to compose entanglement over the complete set of cells within the entangled tree to maintain a liveness over the plurality of links by exchanging the packet of information between the root cells and its neighboring cells, such that the packet of information continues to exchange between the root cell and its neighboring cells until an external event creates a change in the packet of information losing the chain entanglement.

2. The method of claim 1, wherein the packet of information is an Element of Shared Information (ESI), wherein the ESI comprises two complementary halves of the information distributed across two or more cells from the set of cells.

3. The method of claim 2, wherein the ENTL ensures that an observer of the ESI cannot see the ESI until the two halves of the information are complementary.

4. The method of claim 2, wherein the ESI is distributed through a plurality of links across two cells from the set of cells such that one complementary half of the ESI is on one side of the link and the other complementary half of the ESI is on the other side of the link.

5. The method of claim 2, wherein the two complementary halves of the information are combined and swapped such that one complementary half of the information on one side is swapped with the other complementary half of the information on the other side.

6. The method of claim 5, wherein the two complementary halves of information are swapped atomically via an atomic information transfer (AIT).

7. The method of claim 1, wherein the root cell in the entangled tree further comprises zero or more children cells wherein the root cell and children cell are connected through a plurality of links.

8. The method of claim 7, wherein the root cell sends a message to one or neighboring cells for the neighboring cells to connect to the root cell and become a part of the entangled tree.

9. The method of claim 1, wherein the root cell manages a consensus with its neighboring cells through the ENTL protocol.

10. The method of claim 1, wherein the root cell manages automatic failure with its neighboring cells by preselecting a cell for failure.

11. The method of claim 1, wherein the packet of information continues to exchange between the root cell and one of its neighboring cells until the root cell receives an acceptance of the packet of information sent by the root cell to its neighboring cells or the root cells receives counter information from its neighboring cell.

12. The method of claim 1, wherein the packet of information is circulated among the root cell and one of its neighboring cells.

13. The method of claim 1, wherein the method maintains a mutual state coupling by constantly sending the packet of information across the plurality of links.

* * * * *